(12) United States Patent
Crawford et al.

(10) Patent No.: US 12,269,568 B2
(45) Date of Patent: Apr. 8, 2025

(54) TROLLING MOTOR ROTATIONAL CONTROL SYSTEMS

(71) Applicant: NAVICO, INC., Tulsa, OK (US)

(72) Inventors: Christopher D. Crawford, Bixby, OK (US); Blaine Kuehmichel, Wausau, WI (US)

(73) Assignee: Navico, Inc., Tulsa, OK (US)

( * ) Notice: Subject to any disclaimer, the term of this patent is extended or adjusted under 35 U.S.C. 154(b) by 538 days.

(21) Appl. No.: 17/842,896

(22) Filed: Jun. 17, 2022

(65) Prior Publication Data

US 2023/0406471 A1 Dec. 21, 2023

(51) Int. Cl.
*B63H 20/12* (2006.01)
*F16H 19/08* (2006.01)

(52) U.S. Cl.
CPC ............ *B63H 20/12* (2013.01); *F16H 19/08* (2013.01)

(58) Field of Classification Search
CPC ................................ B63H 20/12; F16H 19/08
See application file for complete search history.

(56) References Cited

U.S. PATENT DOCUMENTS

| | | | |
|---|---|---|---|
| 3,241,380 A | 3/1966 | Howing | |
| 3,310,021 A | 3/1967 | Shimanckas | |
| 4,610,632 A | 9/1986 | Osborne | |
| 6,325,685 B1 * | 12/2001 | Knight | B63H 20/007 440/53 |
| 7,538,511 B2 | 5/2009 | Samek | |
| 9,296,455 B2 | 3/2016 | Bernloehr et al. | |
| 9,676,462 B2 | 6/2017 | Bernloehr et al. | |
| 10,035,575 B2 | 7/2018 | Bernloehr et al. | |
| 10,450,043 B1 | 10/2019 | Gyorog et al. | |
| 11,046,408 B1 | 6/2021 | Crawford et al. | |
| 2018/0244361 A1 | 8/2018 | Laster | |
| 2019/0093765 A1 | 3/2019 | Kubota et al. | |
| 2019/0176953 A1 | 6/2019 | Clark et al. | |
| 2019/0322340 A1 | 10/2019 | Clark et al. | |
| 2021/0284310 A1 | 9/2021 | Crawford et al. | |

FOREIGN PATENT DOCUMENTS

CA 2888084 A1 * 10/2015 ........... B63H 20/007

OTHER PUBLICATIONS

Ghost Series Installation Manual; *Lowrance*; 2019; 28 pp.
Ghost Series Operator Manual; *Lowrance*; 2019; 24 pp.

* cited by examiner

*Primary Examiner* — Stephen P Avila
(74) *Attorney, Agent, or Firm* — Nelson Mullins Riley & Scarborough LLP

(57) ABSTRACT

A trolling motor assembly including a main housing and a shaft rotatably coupled therewith. The shaft is rotatable through a first angular displacement about its longitudinal axis that exceeds 360 degrees. A first gear coupled with the shaft is rotatable about the longitudinal axis. A second gear coupled with the first gear has an axis of rotation spaced apart from the longitudinal axis and is rotatable through a second angular displacement that exceeds the first angular displacement. A plurality of discs coupled with the second gear are rotatable about the axis of rotation relative to one another and to the second gear. A first disc defines a first stop that is rotatable into and out of engagement with a second stop coupled with the second gear. A second disc defines a third stop that is rotatable into and out of engagement with a fourth stop coupled with the main housing.

20 Claims, 27 Drawing Sheets

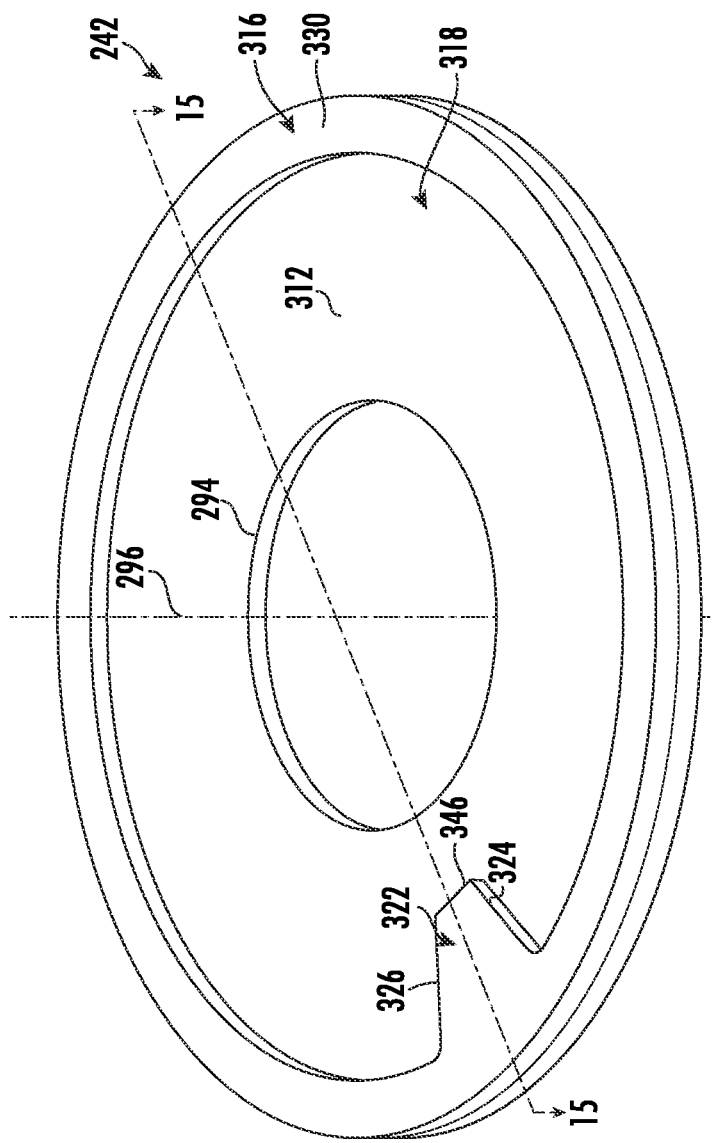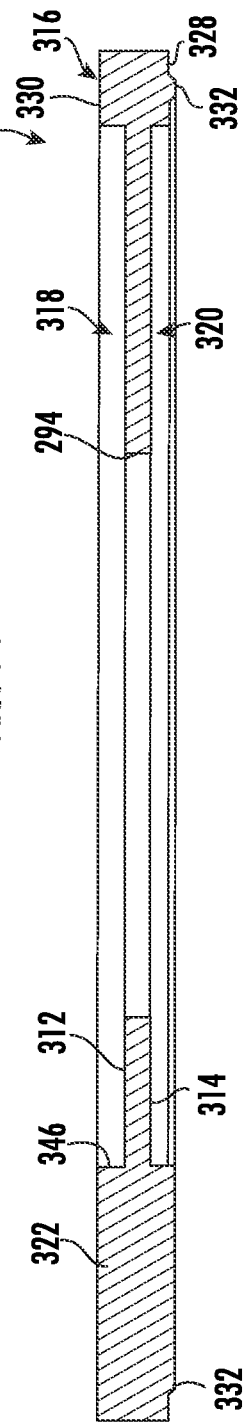

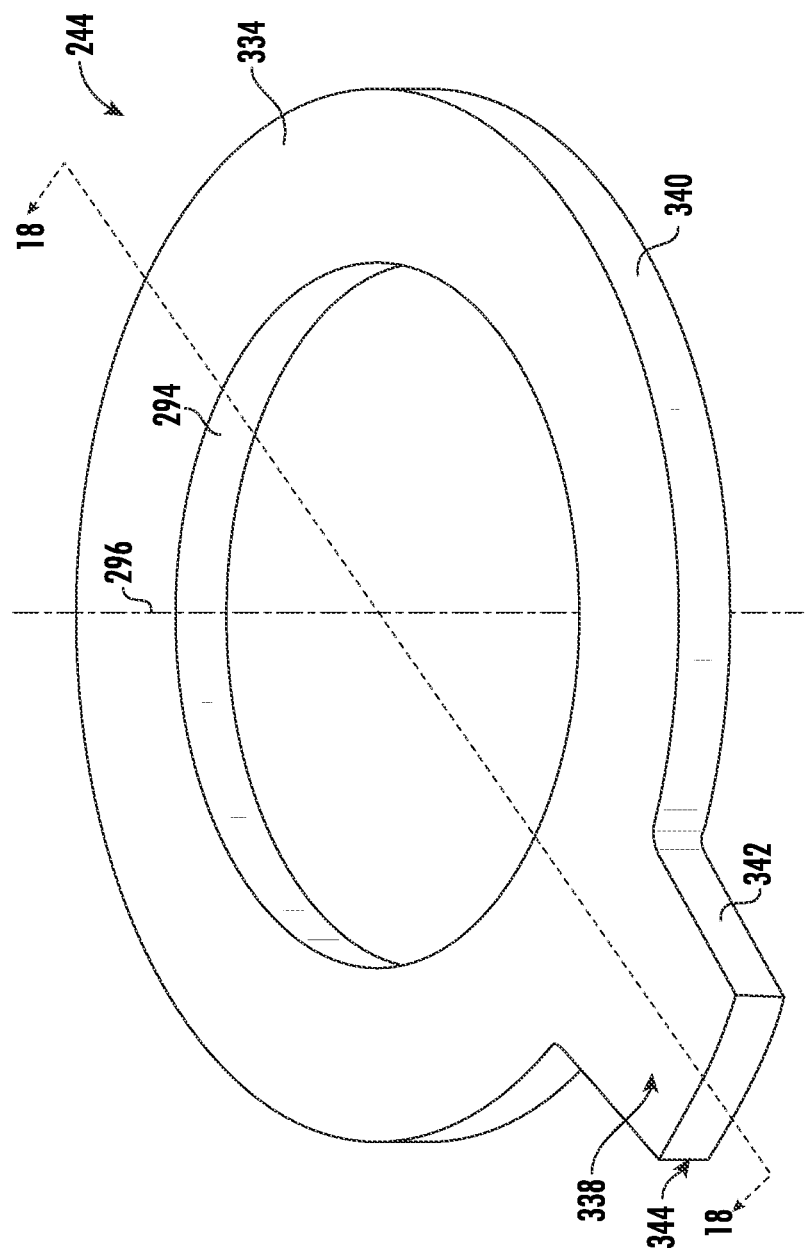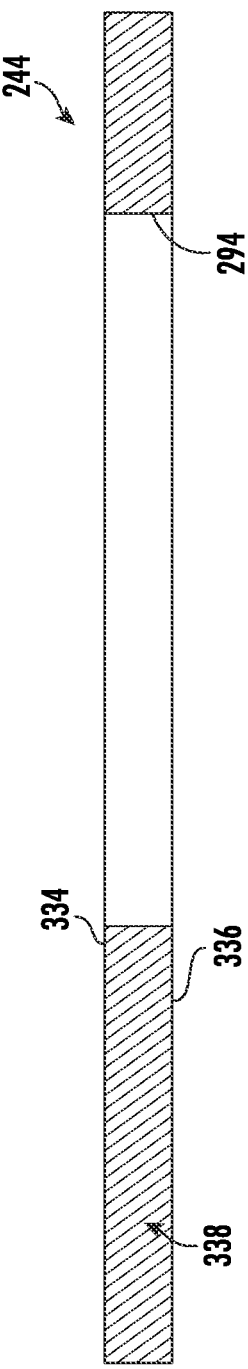

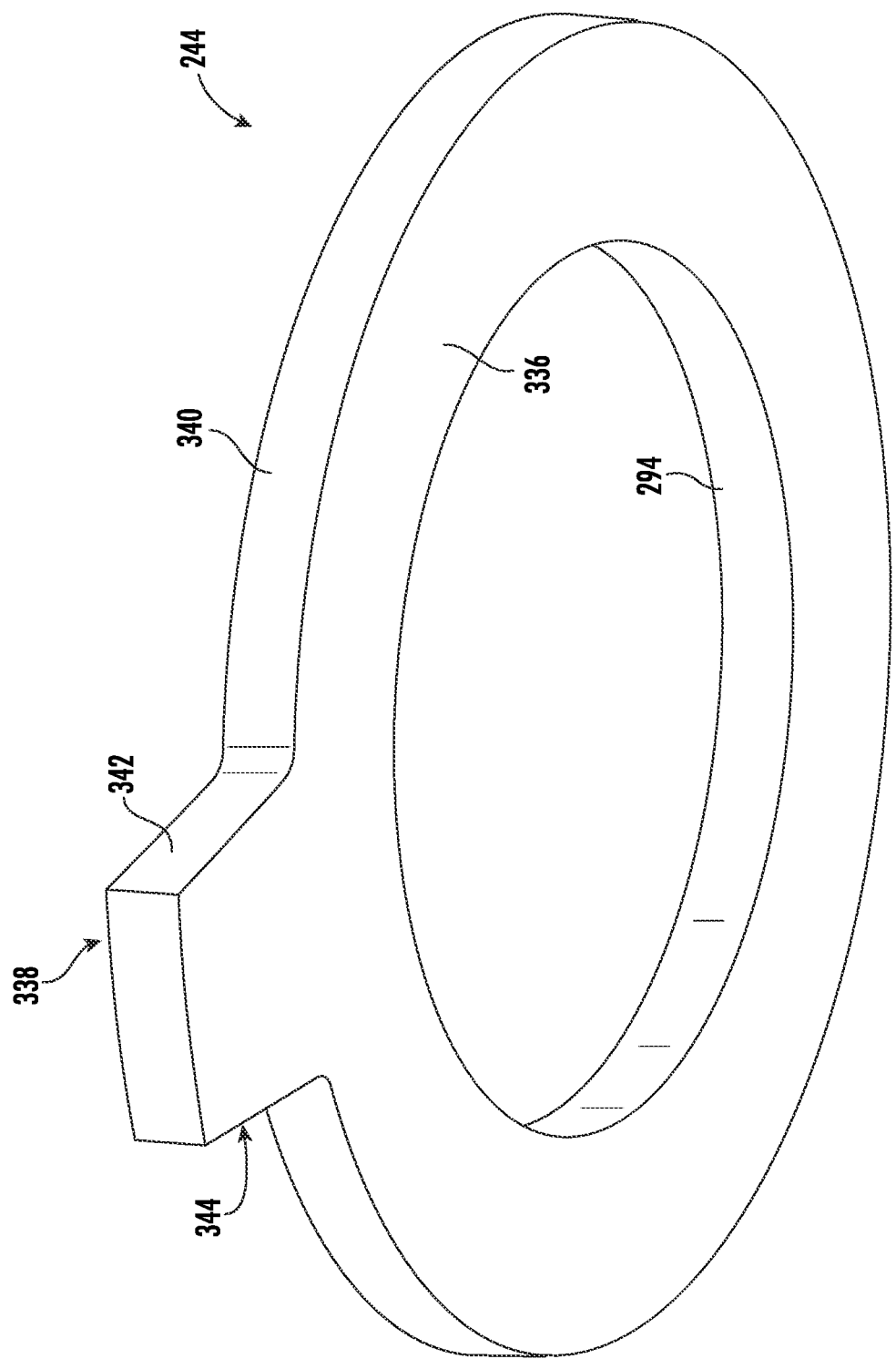

TROLLING MOTOR ROTATIONAL CONTROL SYSTEMS

TECHNICAL FIELD

Embodiments of the present invention generally relate to the field of trolling motor assemblies for recreational vehicles, such as watercraft. More particularly, certain embodiments of the present invention relate to systems, assemblies, and associated methods for preventing over-rotation of components in a trolling motor assembly while also providing for angular displacement of such components greater than 360 degrees.

BACKGROUND

Trolling motors are often used during fishing or other marine activities and are mounted to recreational vehicles, such as watercraft, in a known manner. The trolling motors are mounted or attached to the watercraft and propel the watercraft along a body of water. For example, trolling motors may provide secondary propulsion or precision maneuvering that can be ideal for fishing activities. The trolling motors, however, may also be utilized for the main propulsion system of watercraft. Further, there are many helpful marine data features, such as navigation, sonar, motor/vessel gauges, among others, that can be used by operators or users of the watercraft with a trolling motor.

The foregoing discussion is intended only to illustrate various aspects of the related art in the field of the invention at the time, and should not be taken as a disavowal of claim scope.

SUMMARY

In some existing trolling motors, electronic components, such as a propulsion motor and/or sonar transducers, are disposed in a lower housing disposed at one end of a shaft. Wiring associated with these electronic components (e.g., power and communication wiring) may extend from the lower housing along the shaft (either internally or externally) to another housing, such as a mount or an upper housing disposed at the opposite end of the shaft. There, the wiring may connect to other electronic components, such as a processor and memory, or may extend to a power source, for example.

Trolling motors can be mechanically or electrically driven. In mechanically driven trolling motors (sometimes referred to as "cable-steer" motors), cables associated with a user-controlled foot pedal are mechanically linked to the propulsion motor. Very generally, pivoting of the foot pedal in such trolling motors pulls the cables, thereby causing the propulsion motor to rotate. "Hybrid" trolling motors are similar and may combine the use of cables with electrical features, such as power steering and autopilot. In trolling motors that employ cable steering, whether in whole or in part, the cables limit the total available rotation of the propulsion motor.

Electrically-driven trolling motors, however, do not have cables that are mechanically linked to the propulsion motor. Rather, in these trolling motors, a sensor in the foot pedal may determine the position of the foot pedal and provide that information to a processor in the upper housing of the trolling motor. The processor may use that information to cause the propulsion motor to rotate. In these types of trolling motors, the lower housing and shaft are typically free to rotate about the axis of the shaft through multiple revolutions, at least in the absence of another limit on rotation.

Over-rotation of electrically-driven trolling motors can damage the wiring that extends along the shaft and within the motor's upper housing (shown, e.g., in FIG. 4C) and/or the electronic components to which the wiring is connected. As the lower housing and shaft rotate in a given direction about the shaft axis beyond one revolution, the wiring that is connected to components in the lower and/or upper housing(s) will become twisted. Depending on the amount of play or slack in the wiring, after one, two, or more full revolutions in a given direction, the wiring itself can become pinched or stretched, or it could break or at least separate from the electronic components to which it is connected, causing the trolling motor to become inoperative. Over-rotation may occur, for example, when a user manually turns the trolling motor when the motor is not operating (e.g., during installation, maintenance, a power failure event, or storage) or it may occur during normal use in response to a user's actuation of a control mechanism (such as a foot pedal).

Although it is possible to limit the trolling motor's rotation to a maximum of 360 degrees via mechanical means, consumers typically expect that trolling motors will be rotatable through an angle greater than 360 degrees. This is because users may experience limitations on maneuverability if rotation is limited to a maximum of 360 degrees. For instance, if a user driving a watercraft with the propulsion motor oriented at an angle of 0 degrees were to reverse course and turn the motor in a given direction to 180 degrees, the motor may encounter a limit on its rotation. The user would find his maneuverability similarly limited, in that the user could not continue turning the motor in the same direction beyond 180 degrees, and thus may not be able to steer with the motor in this position. To steer the watercraft to 185 degrees, for example, the user would have to turn the motor almost a full revolution back around in an opposite direction.

Many existing trolling motors are not able to provide greater than 360 degrees of rotation of a propulsion motor while also sufficiently preventing the problem of over-rotation. Some trolling motors have rotational limits programmed into software associated with the motor's controller. For example, software may be programmed to limit the motor's rotation to a predetermined angular rotation. However, such software cannot prevent over-rotation that may occur when the trolling motor is off, or that may occur as a result of a software bug or malfunction. The software may also not be able to determine the angular position of the propulsion motor once power is reapplied, because the software cannot track the motor's rotation when power is off. Additionally, in an existing trolling motor that limits rotation via mechanical means but that nonetheless allows some rotation beyond 360 degrees, actuation of the propulsion motor once the mechanical limit on angular displacement is reached can cause a large torque to be applied to the mechanical stop. Torques of large magnitude may damage the trolling motor's mechanical stop or other mechanical components.

One embodiment of the invention provides a trolling motor assembly. The trolling motor assembly comprises a main housing and a shaft rotatably coupled with the main housing. The shaft has a longitudinal axis and is rotatable about the longitudinal axis through a first angular displacement exceeding 360 degrees. A first element is disposed within the main housing and coupled with the shaft. The first element defines an axis of rotation that is spaced apart from the longitudinal axis. The first element is rotatable through a second angular displacement about the axis of rotation. The first element also comprises a first stop. A second element is rotatable about the axis of rotation relative to the first element through a third angular displacement. The second element comprises a second stop. A third element is rotatable about the axis of rotation relative to the first element and to the second element through a fourth angular displacement. The third element comprises a third stop. The second angular displacement is greater than the third and fourth angular displacements. The third angular displacement is greater than the fourth angular displacement.

In various embodiments, the first element comprises a gear. In some embodiments, the trolling motor assembly also comprises a motor disposed within the main housing and having an output shaft. In some examples, the trolling motor assembly further comprises a second gear coupled with the shaft and rotatable about the longitudinal axis and a third gear coupled for rotation with the motor output shaft. In various embodiments, the trolling motor assembly further comprises a fourth gear engaged between the gear of the first element and the second gear. Also, in some embodiments, the trolling motor assembly comprises an inner housing disposed within the main housing, wherein a fourth stop is coupled with an interior surface of the inner housing. Additionally, in some examples, the third stop of the third element comprises a first side and a second side, wherein the fourth angular displacement is between a first angular position, at which the first side engages the fourth stop, and a second angular position, at which the second side engages the fourth stop. In some embodiments, the first stop is rotatable into and out of engagement with the second stop, the second stop is rotatable into and out of engagement with the first stop and the third stop, and the third stop is rotatable into and out of engagement with the second stop and the fourth stop. In various embodiments, the first angular displacement is about 600 degrees and wherein the second angular displacement is about 4200 degrees. Finally, in some embodiments, the trolling motor assembly further comprises a fourth element rotatable through a fifth angular displacement about the axis of rotation that is less than the third and fourth angular displacements.

In accordance with another example embodiment, a trolling motor assembly comprises a main housing and a shaft rotatably coupled with the main housing. The shaft has a longitudinal axis and is rotatable about the longitudinal axis through a first angular displacement that exceeds 360 degrees. A first gear is coupled with the shaft for rotation about the longitudinal axis. A second gear coupled with the first gear and has an axis of rotation spaced apart from the longitudinal axis. The second gear is rotatable about the axis of rotation through a second angular displacement that exceeds the first angular displacement. A plurality of discs are coupled with the second gear. Each of the plurality of discs is rotatable about the axis of rotation relative to one another and to the second gear. A first disc of the plurality of discs defines a first stop that is rotatable into and out of engagement with a second stop coupled with the second gear, and a second disc of the plurality of discs defines a third stop that is rotatable into and out of engagement with a fourth stop coupled with the main housing.

In various embodiments, the first disc defines a top surface facing away from the second gear and a bottom surface opposite the top surface, and the first disc further comprises a circumferential lip that projects from the top surface and from the bottom surface. In some embodiments, the peripheral lip comprises a bead projecting from the lip. In other embodiments, the first stop comprises a member projecting from the top surface and from the bottom surface and extending radially inward from the peripheral lip. In some example embodiments, the second disc comprises an annular body portion and a tab projecting radially outward from the annular body portion. In various examples, the plurality of discs comprises eight or more discs. In still other examples, the second gear comprises a cylindrical projection on which the plurality of discs are disposed.

In accordance with yet another embodiment, a trolling motor assembly comprises a main housing and a shaft rotatably coupled with the main housing. The shaft defines a longitudinal axis. A gear is coupled with the shaft, and the gear has an axis of rotation spaced apart from the longitudinal axis. The gear comprises a first stop, the first stop having a first side and a second side. A first disc is coupled with the gear and rotatable with respect thereto about the axis of rotation. The first disc comprises a second stop, the second stop having a first side and a second side. A second disc is coupled with the gear and rotatable with respect thereto about the axis of rotation. The second disc comprises a third stop, the third stop having a first side and a second side. The shaft is rotatable through an angular displacement between a first angular position and a second angular position. At the first angular position, the first side of the third stop is in engagement with a fourth stop coupled with the main housing, the first side of the second stop is in engagement with the second side of the third stop, and the first side of the first stop is in engagement with the second side of the second stop. At the second angular position, the second side of the third stop is in engagement with the fourth stop, the second side of the third second stop is in engagement with the first side of the third stop, and the second side of the first stop is in engagement with the first side of the second stop.

In various embodiments, the first disc is formed from a plastic material. In some embodiments, the second disc is formed from a metal material.

BRIEF DESCRIPTION OF THE DRAWINGS

Figure 1:
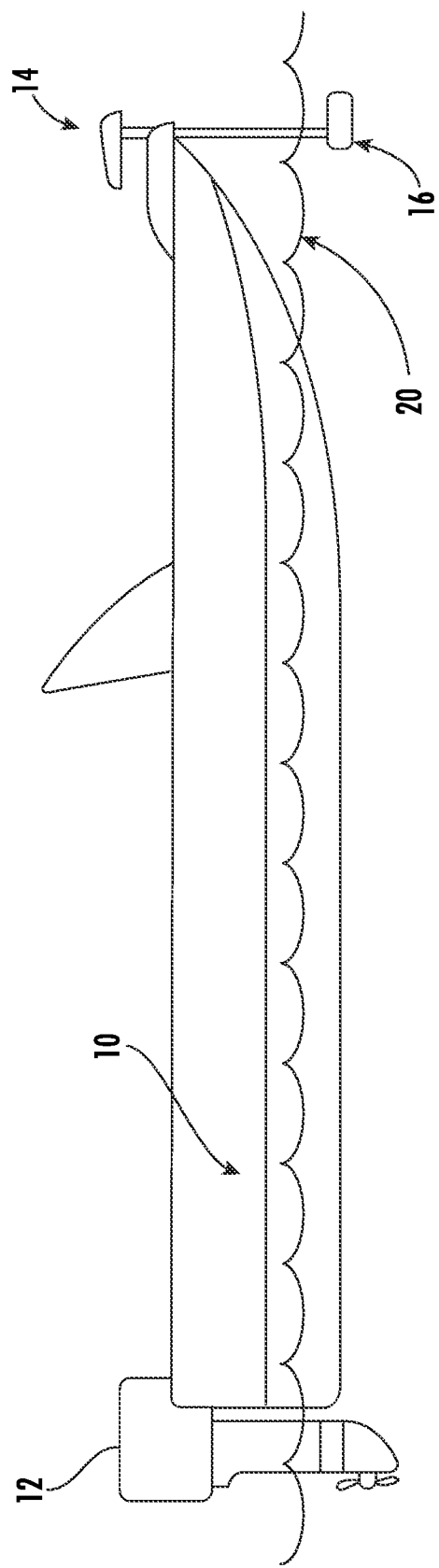
Figure 2:
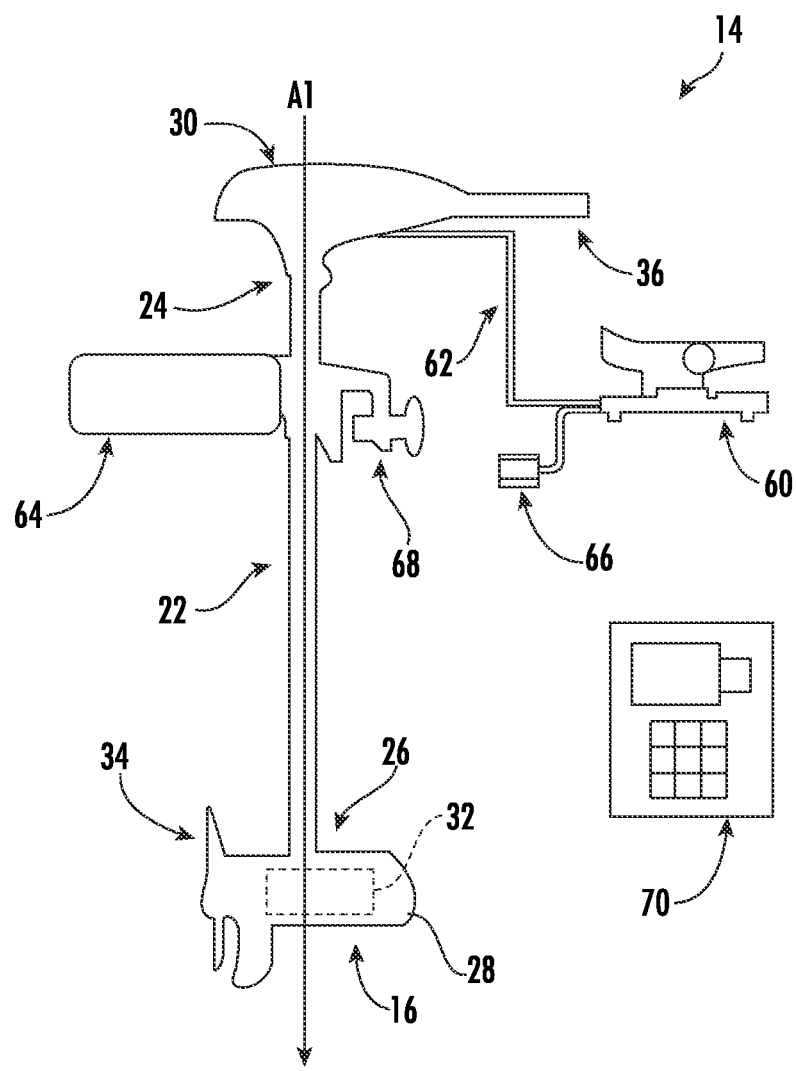
Figure 3:
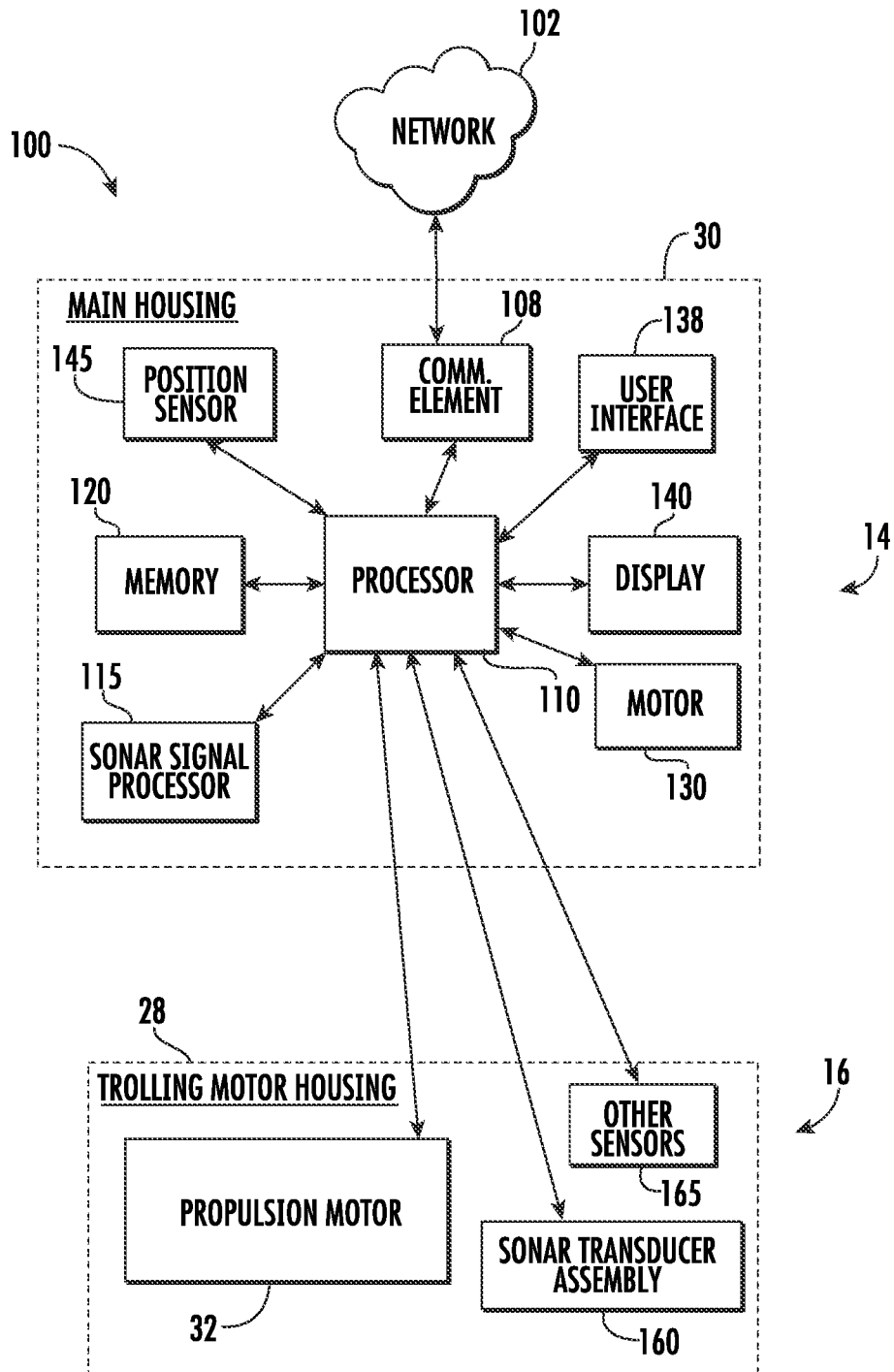
Figure 4A:
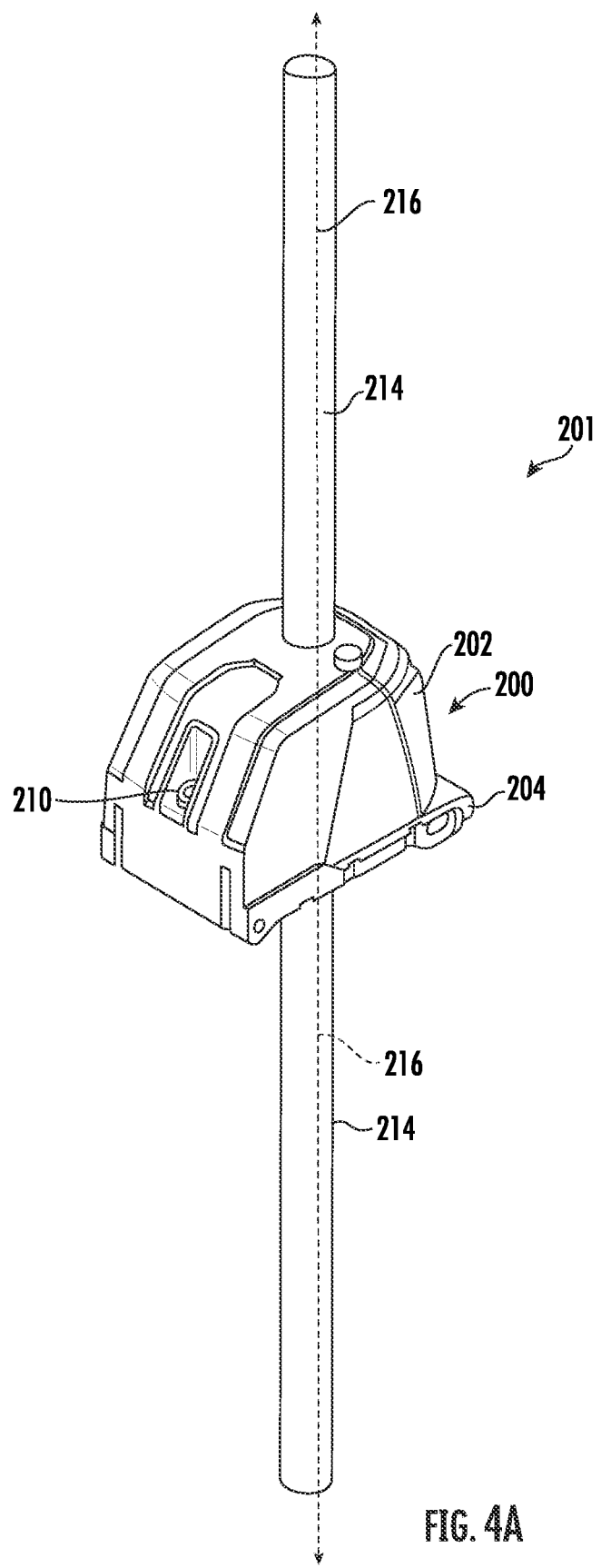
Figure 4B:
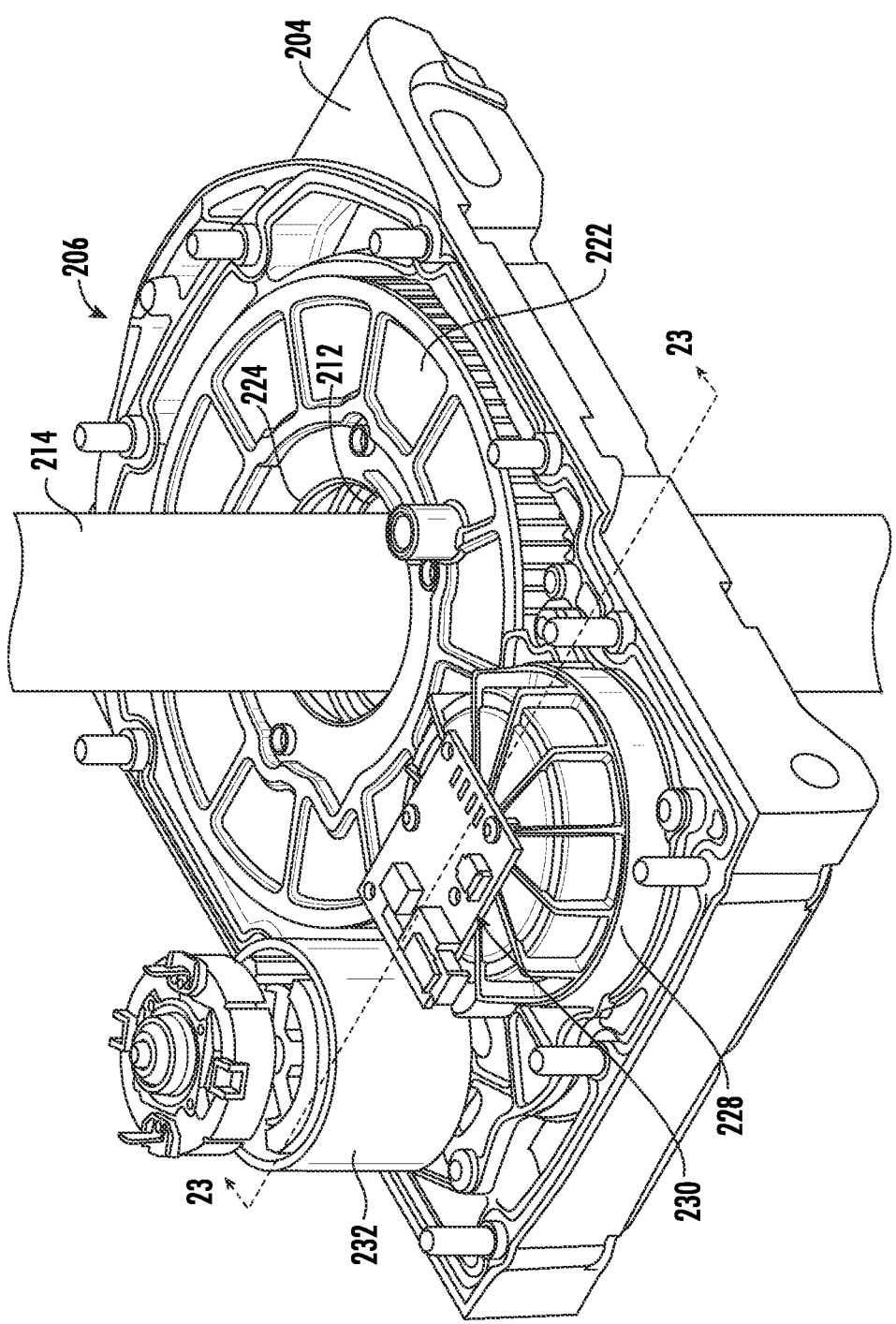
Figure 4C:
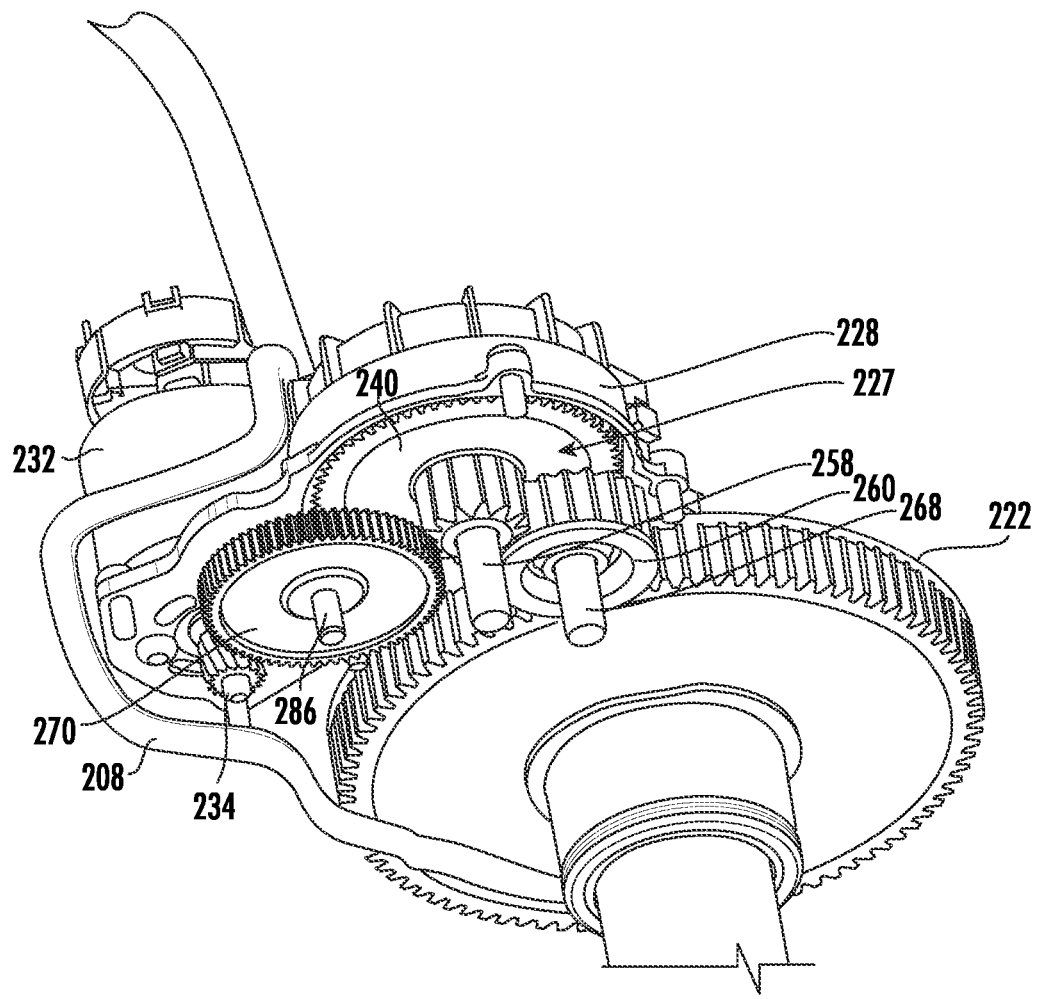
Figure 4D:
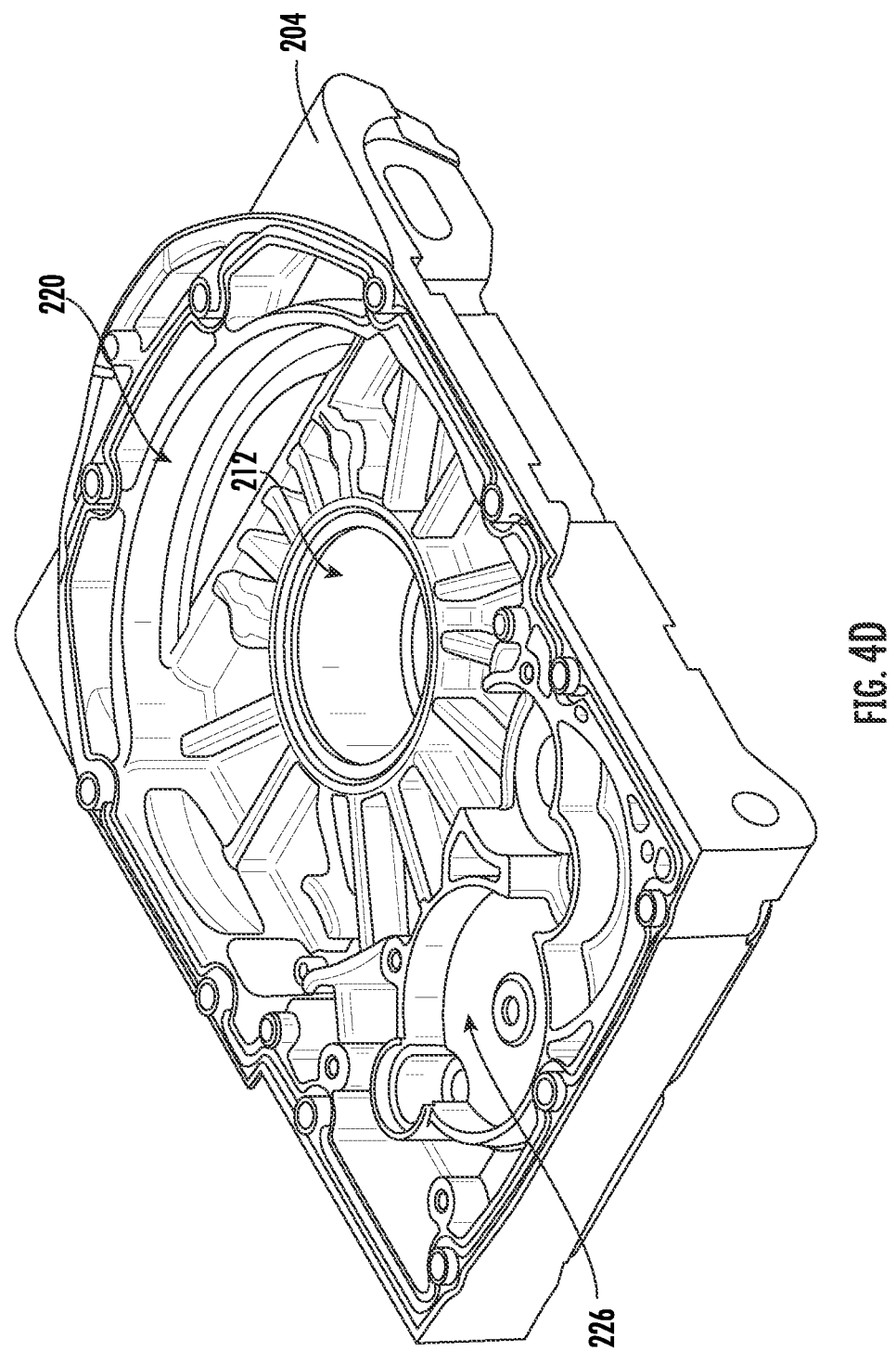
Figure 5:
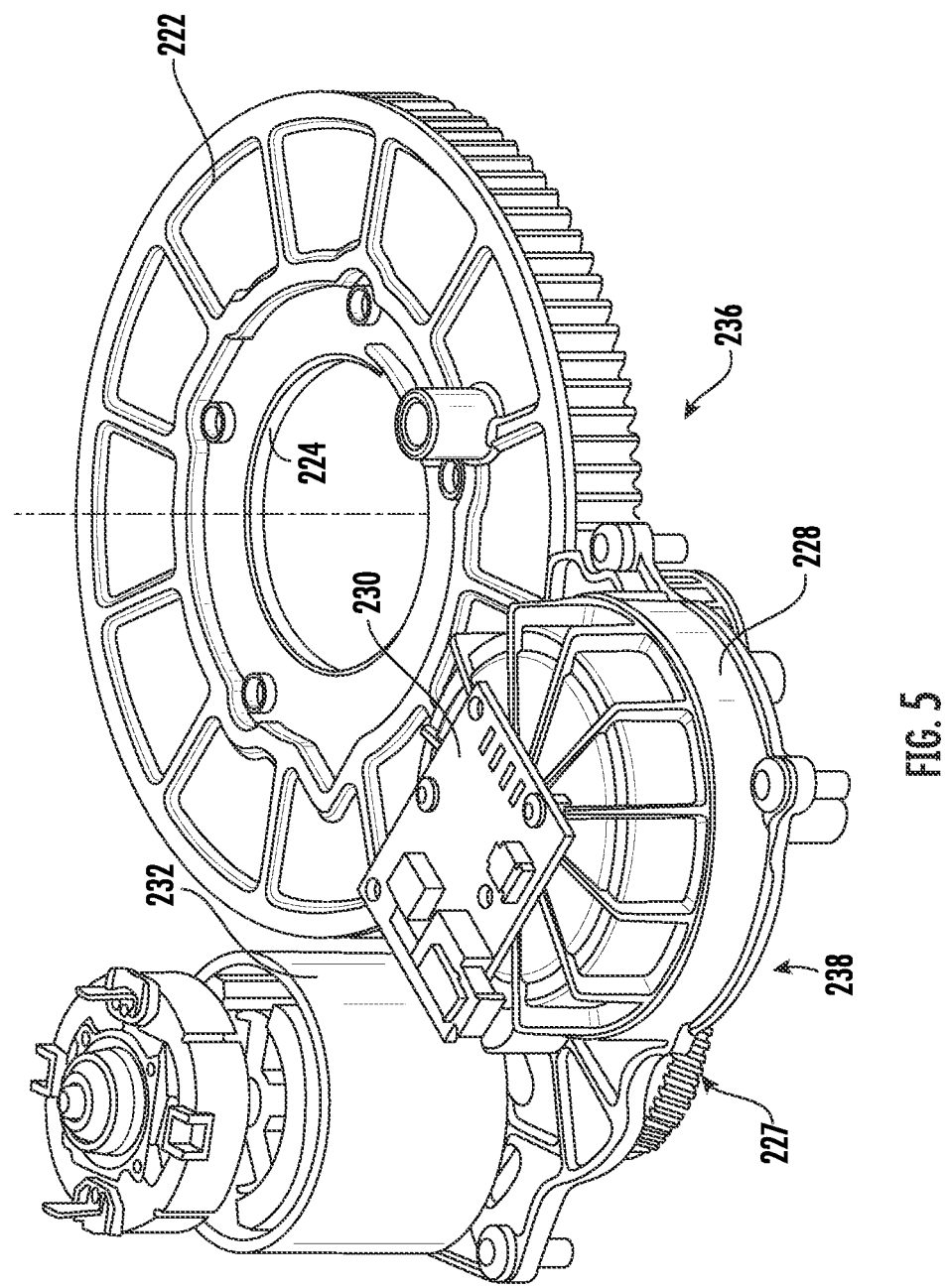
Figure 6:
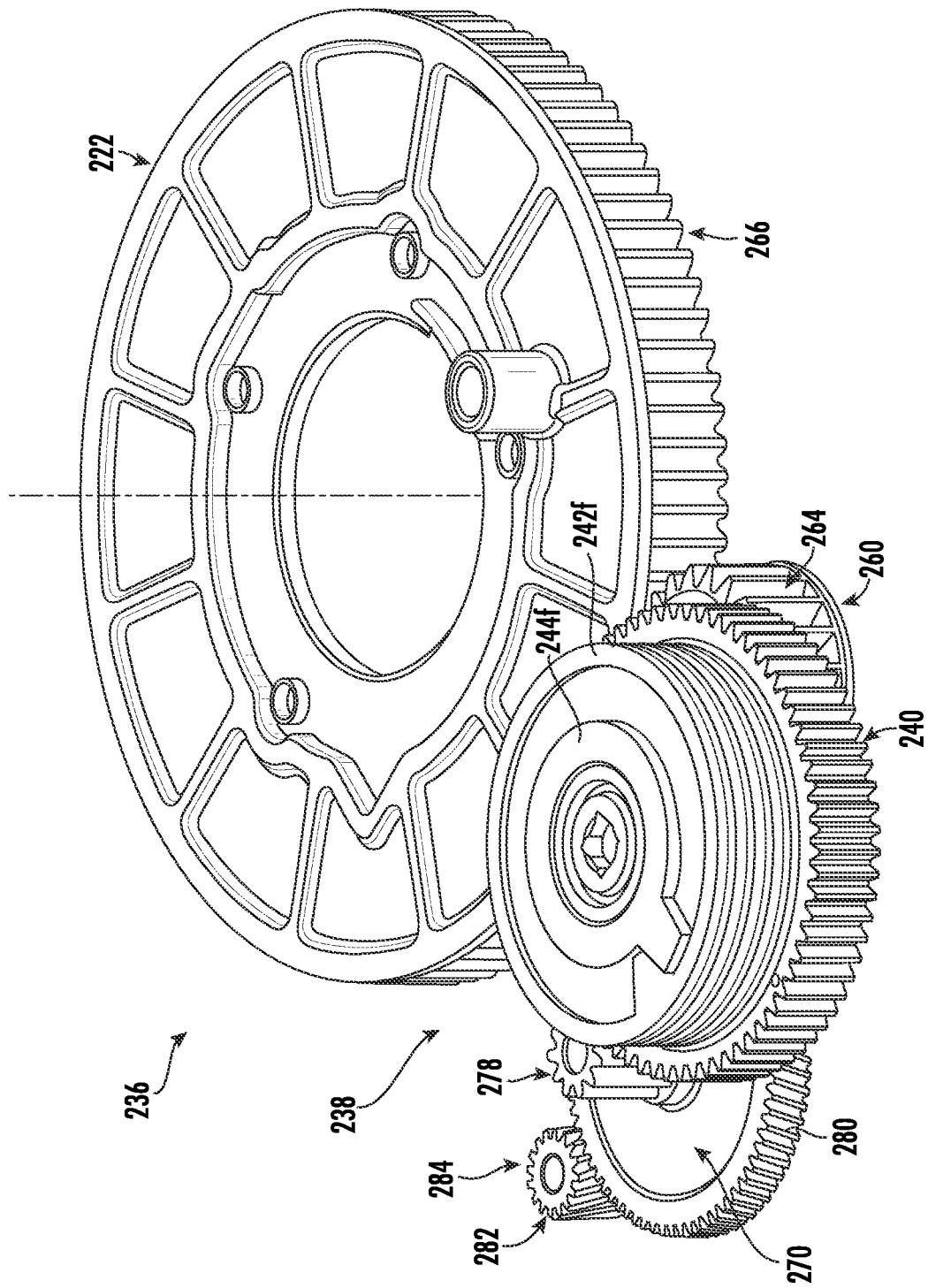
Figure 7:
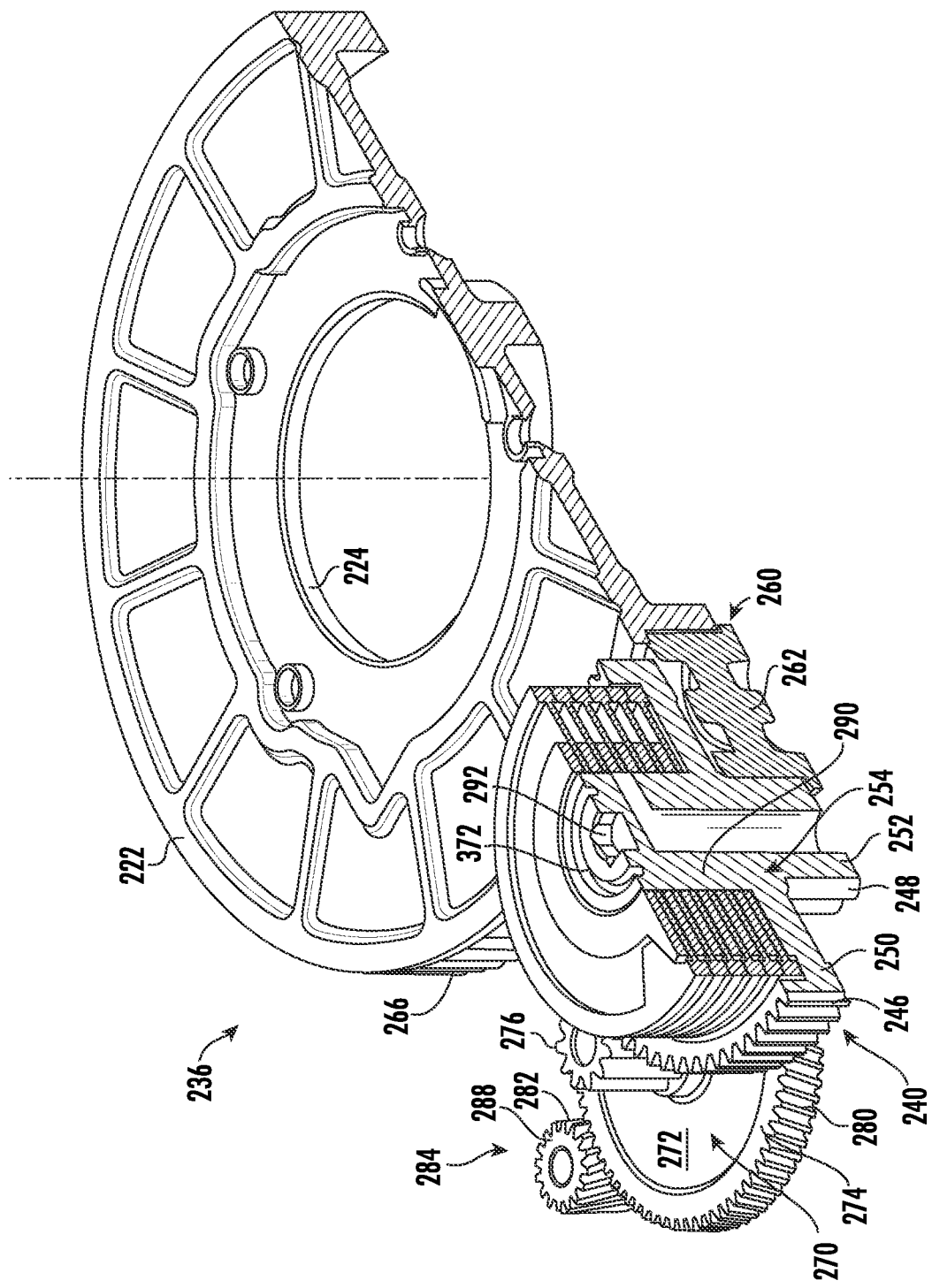
Figure 8:
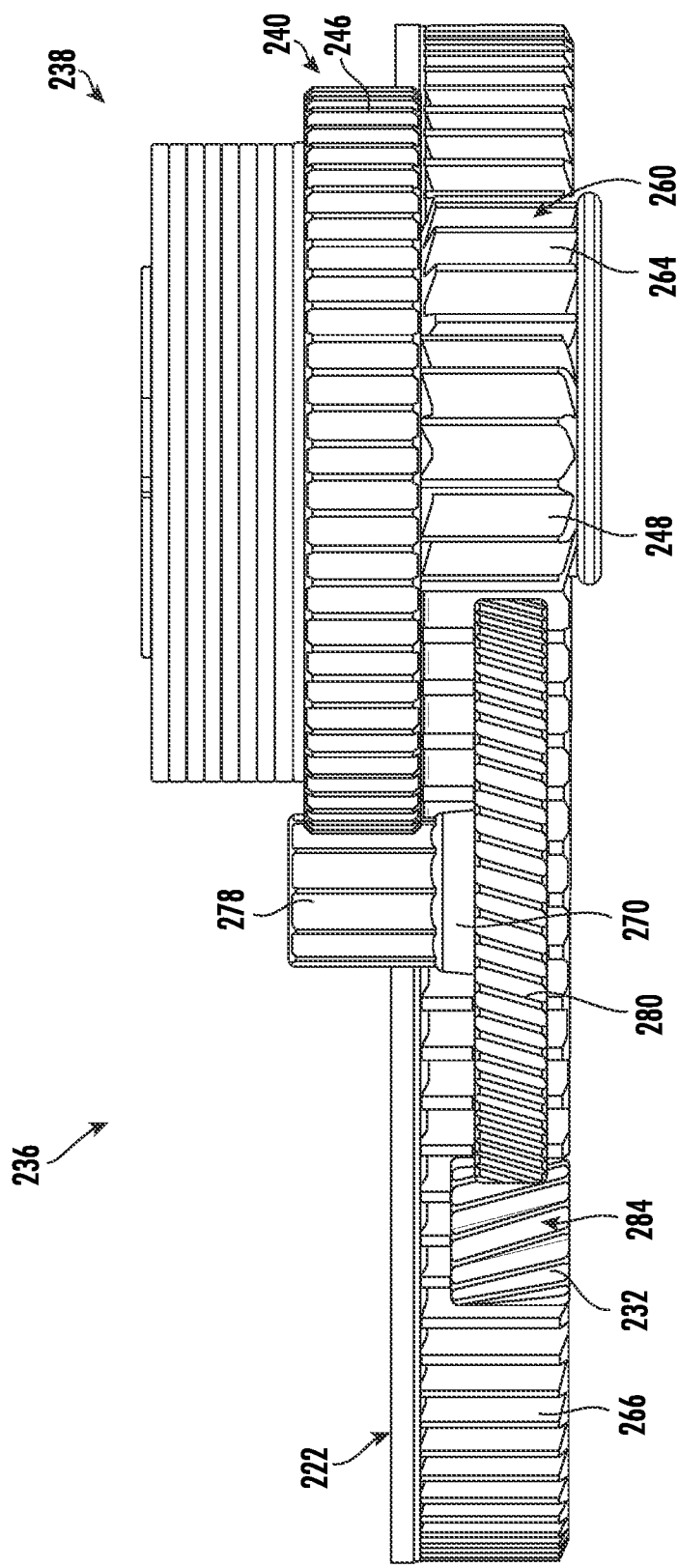
Figure 9:
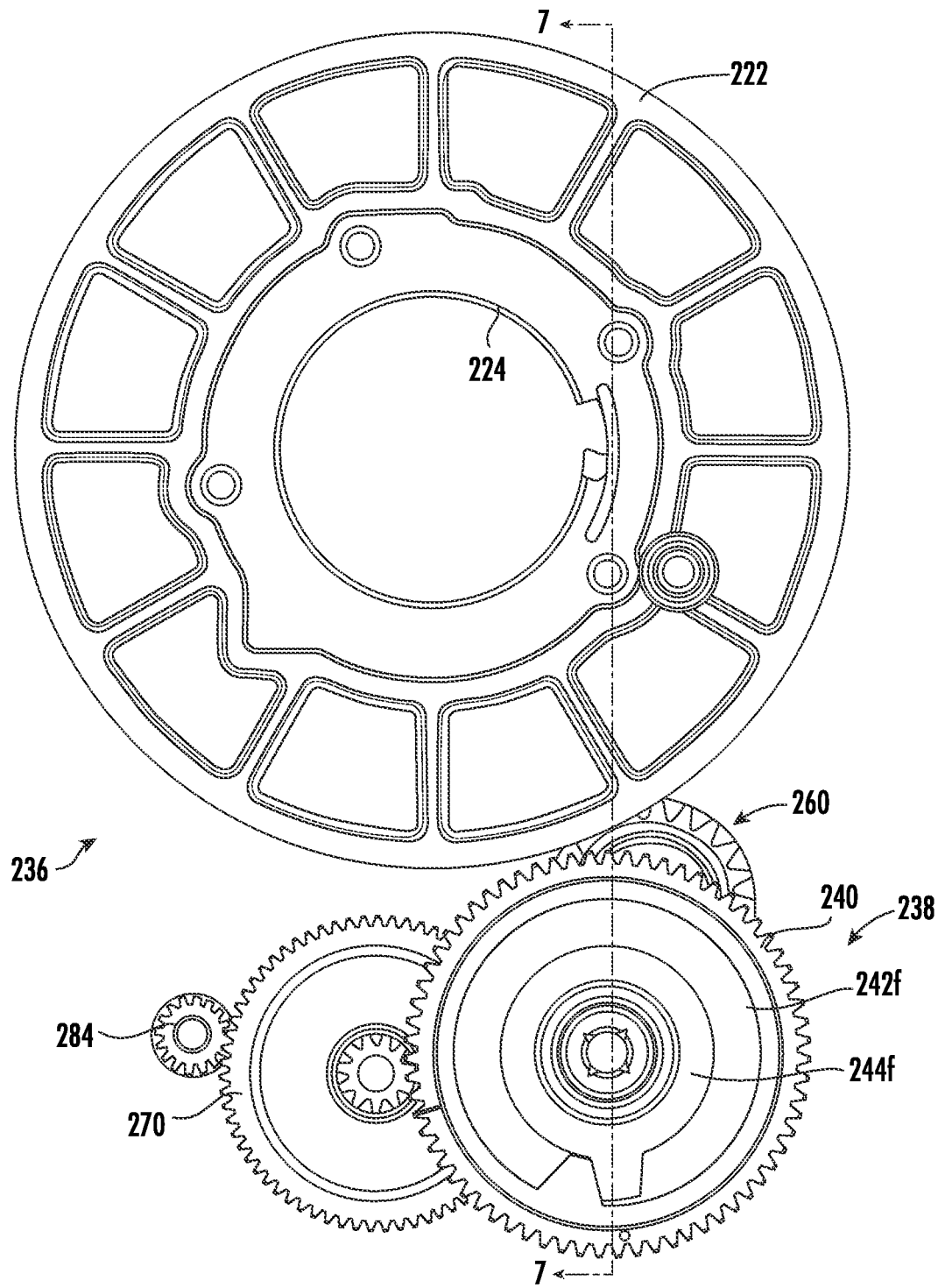
Figure 10A:
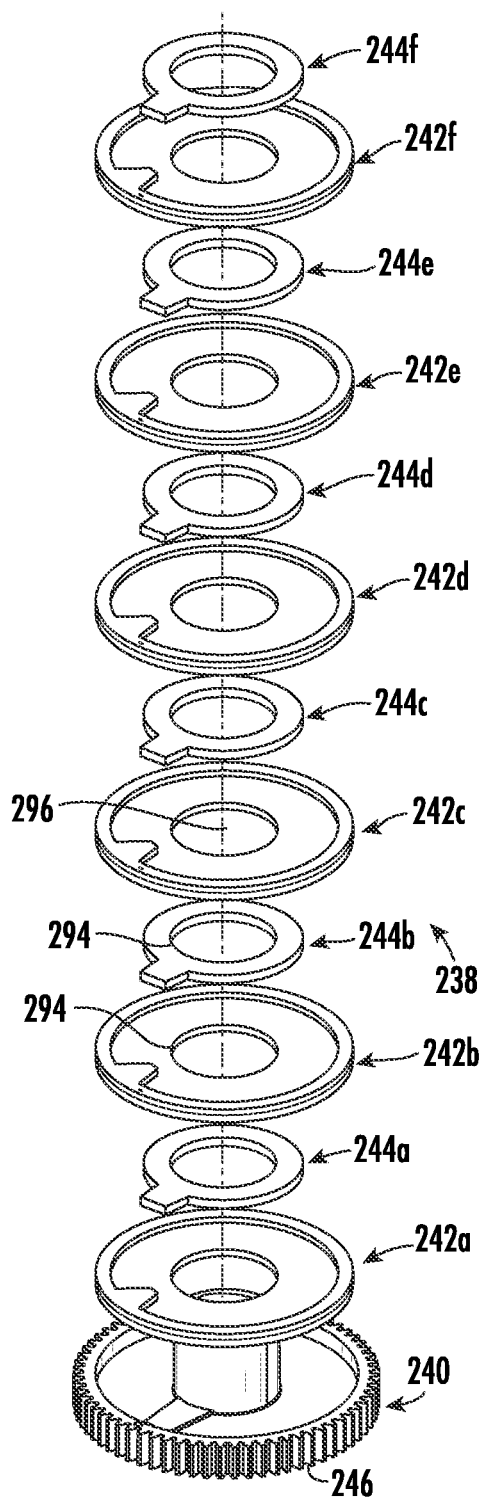
Figure 10B:
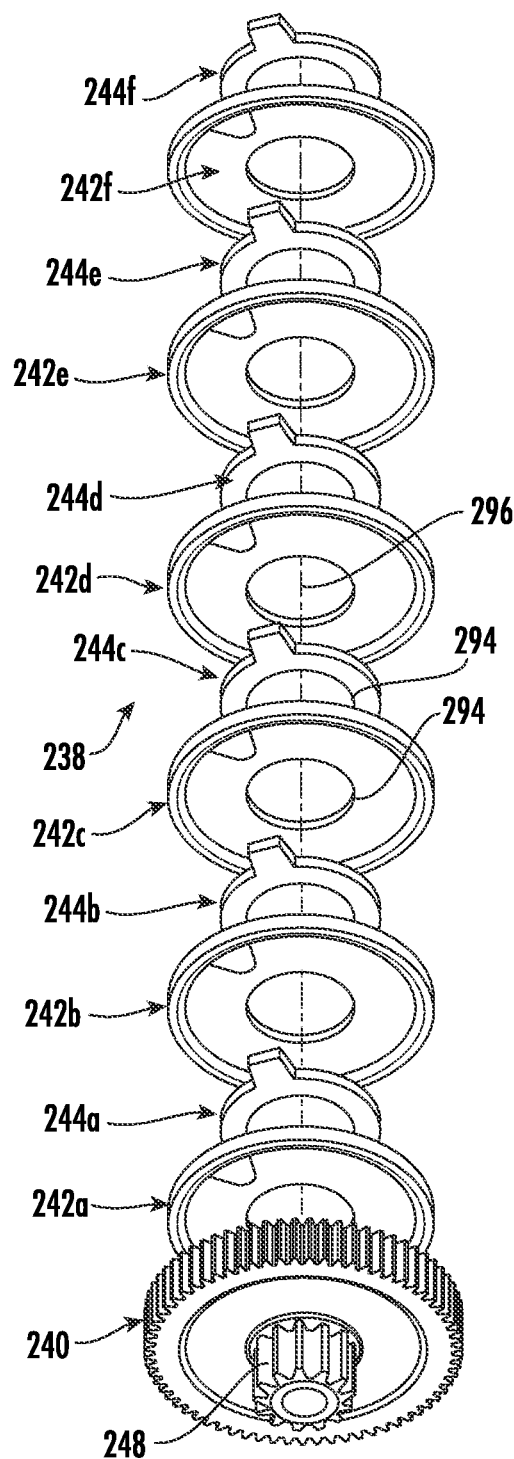
Figure 11:
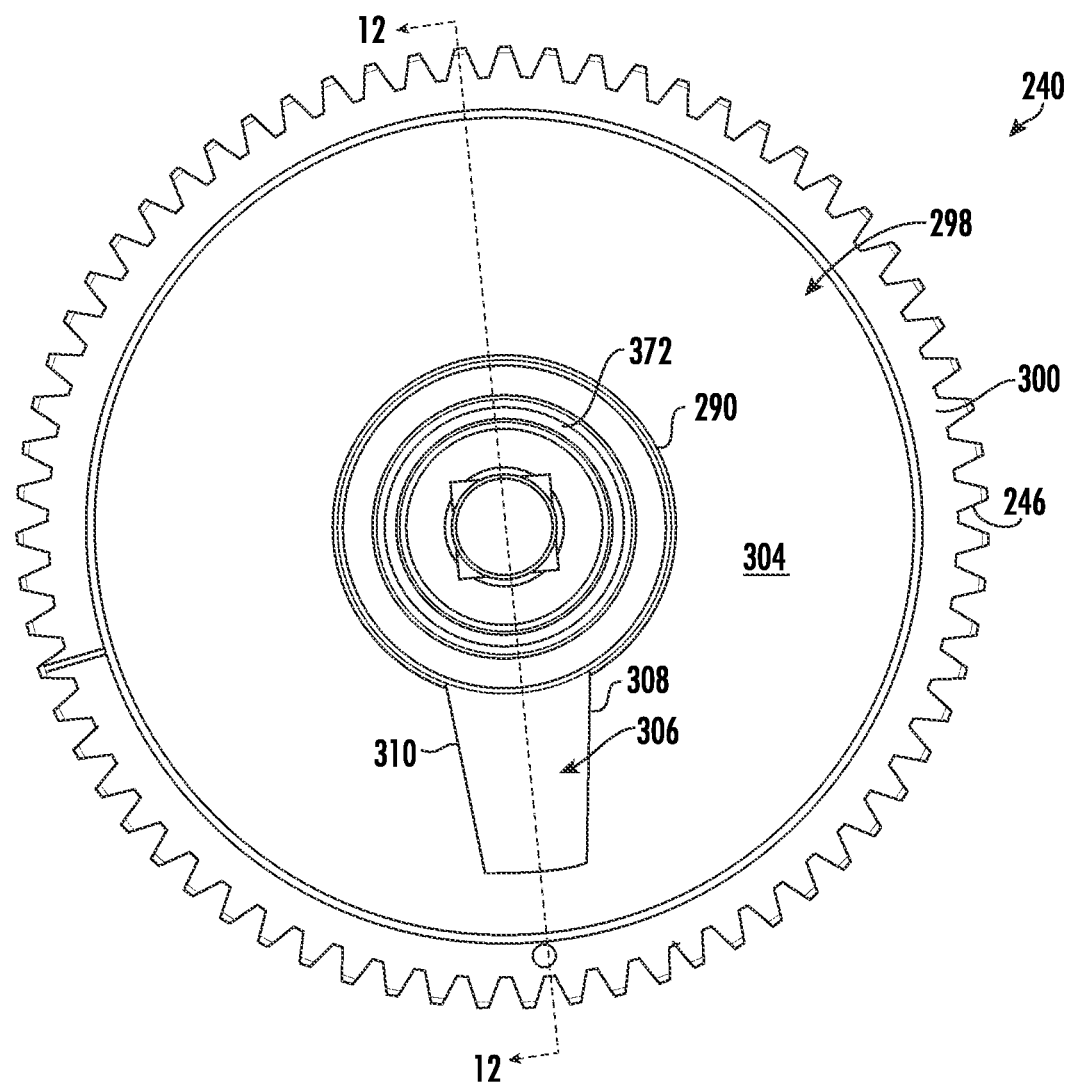
Figure 12:
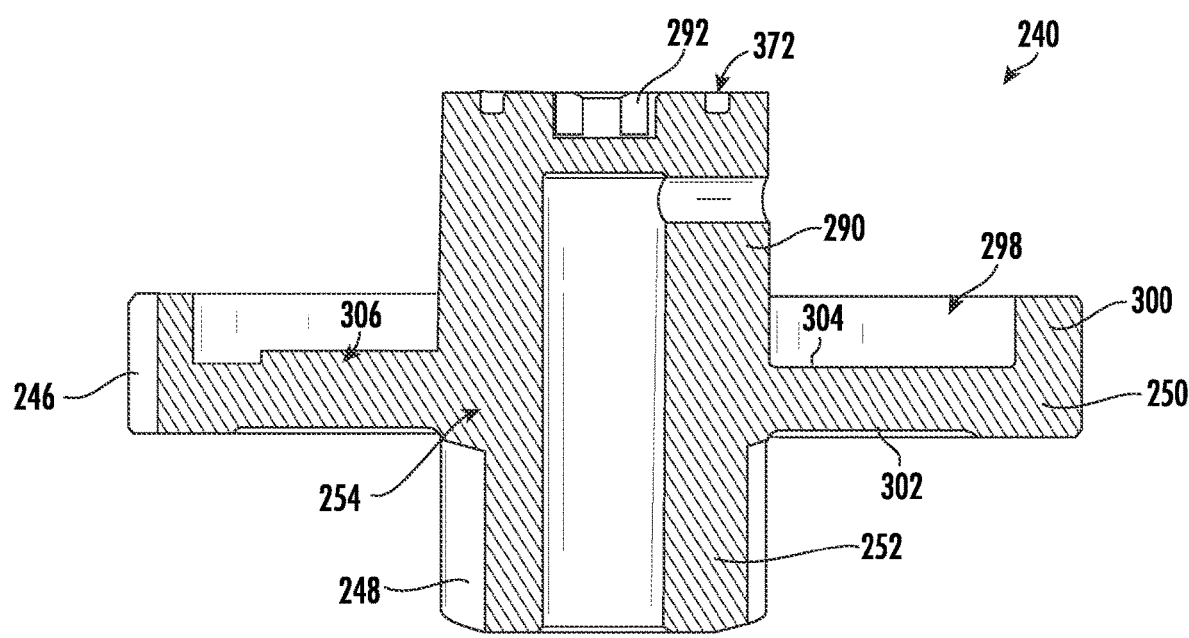
Figure 13:
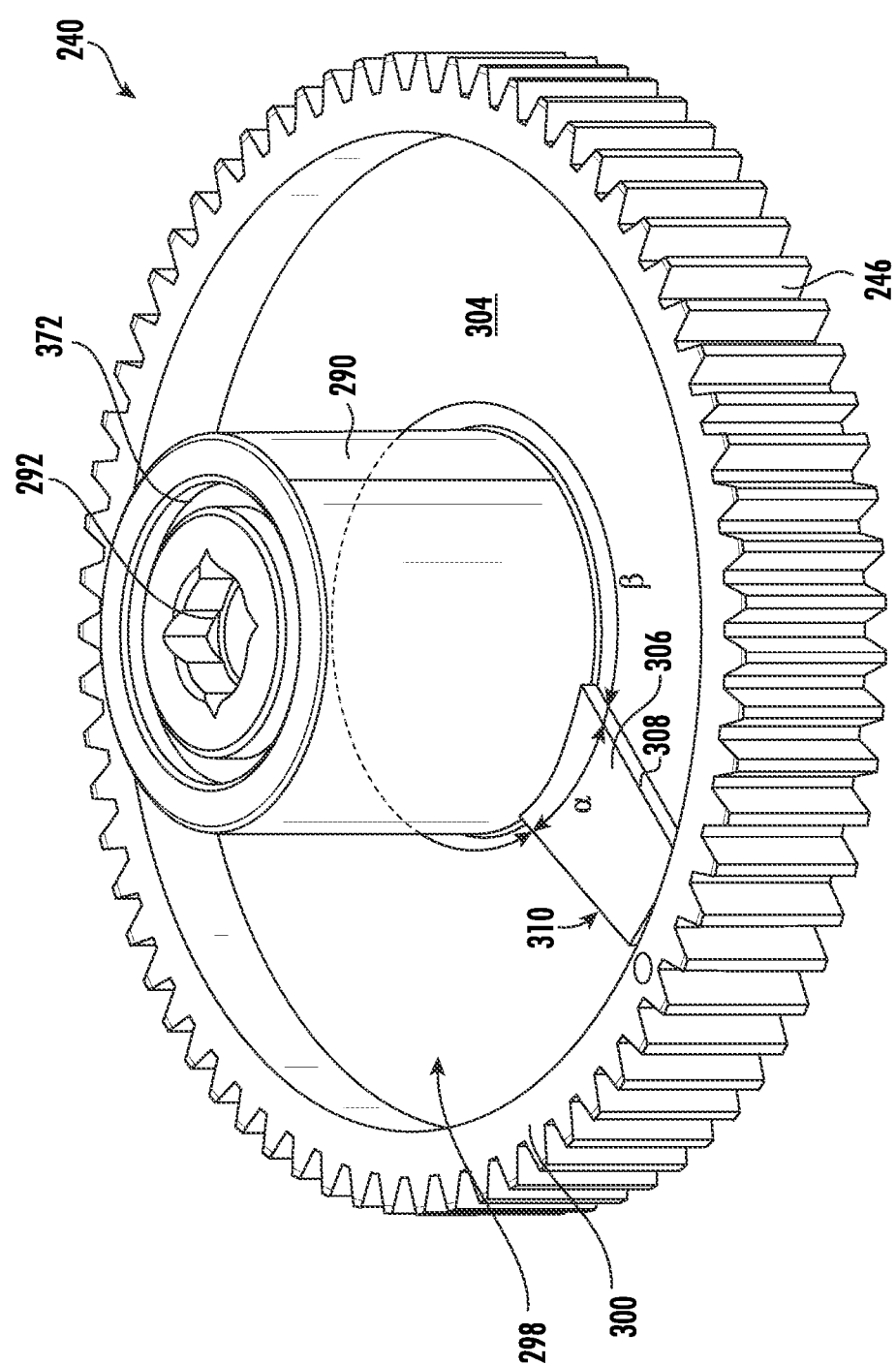
Figure 16:
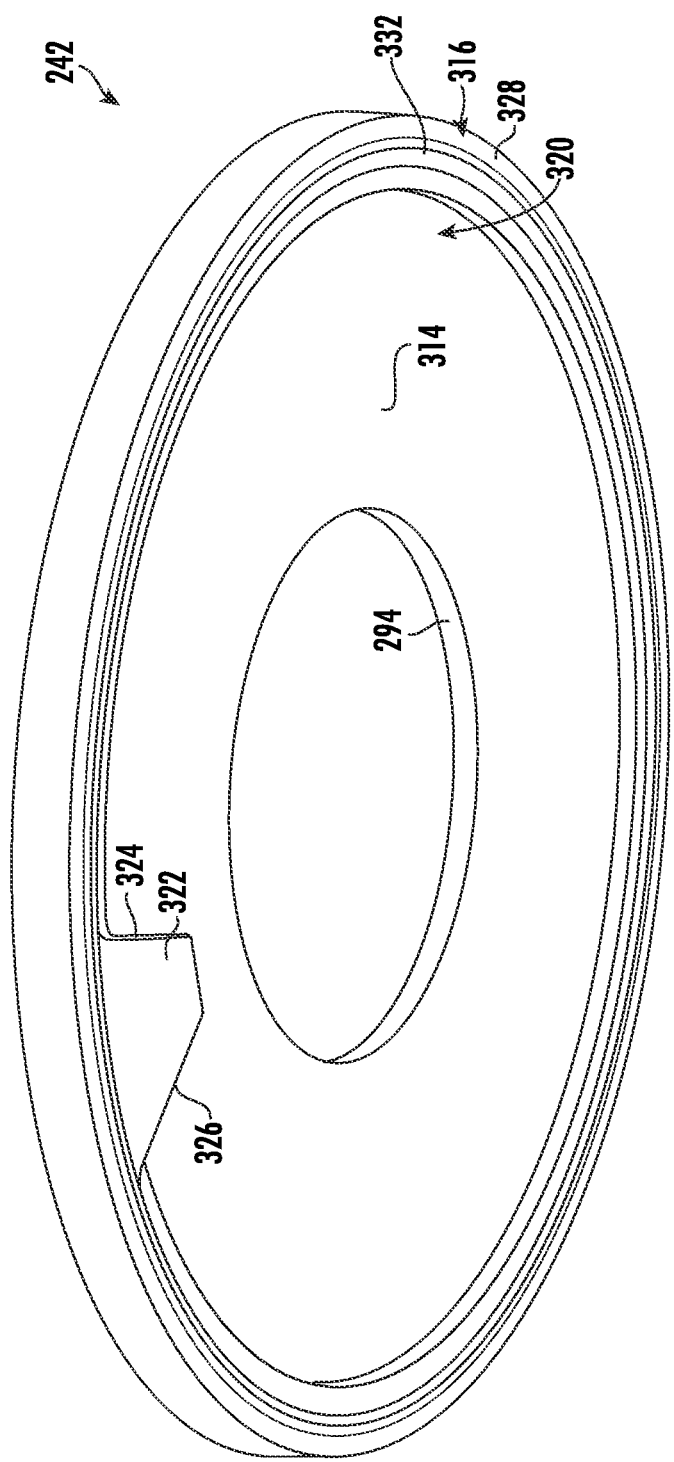
Figure 20:
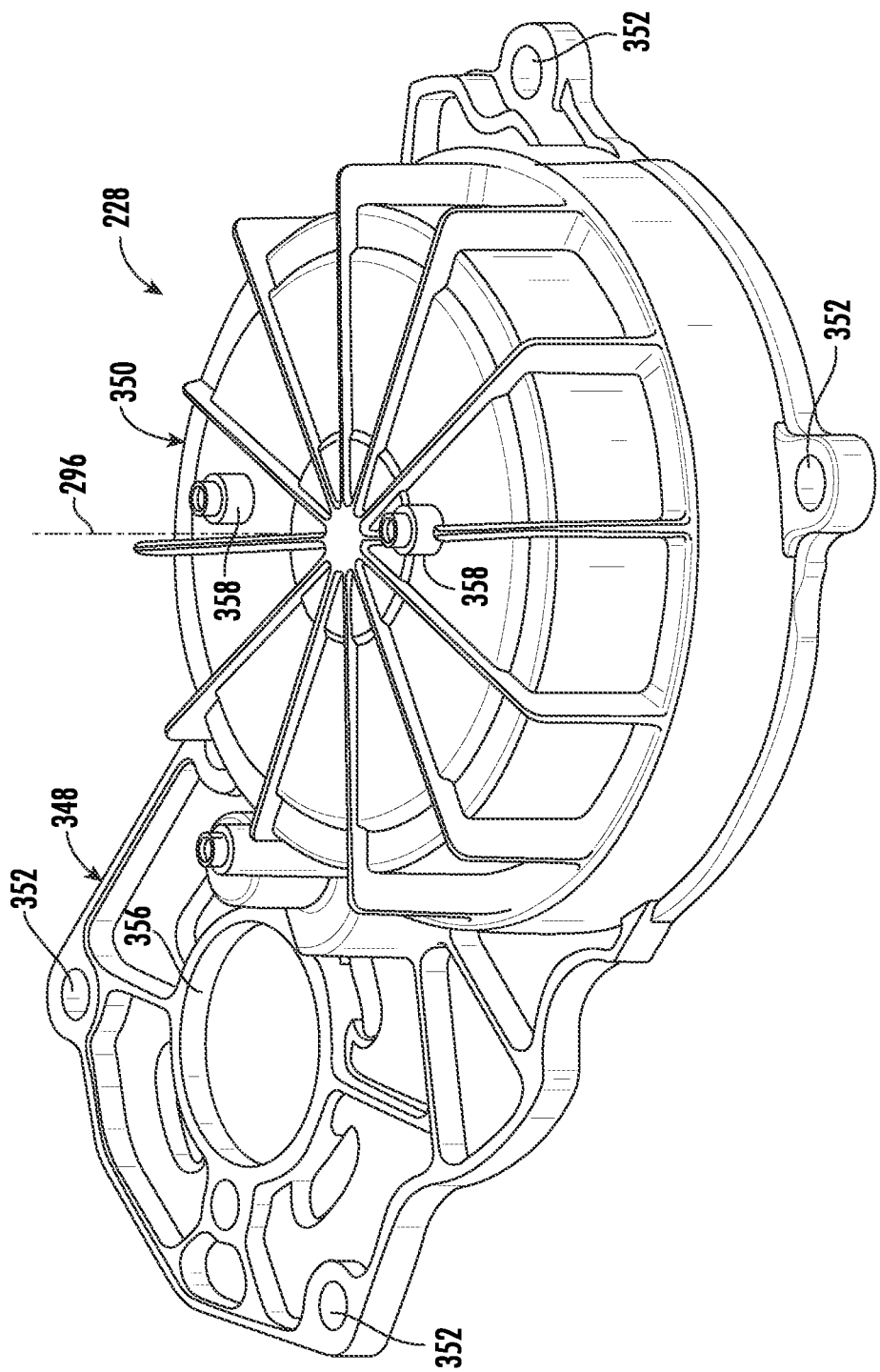
Figure 21:
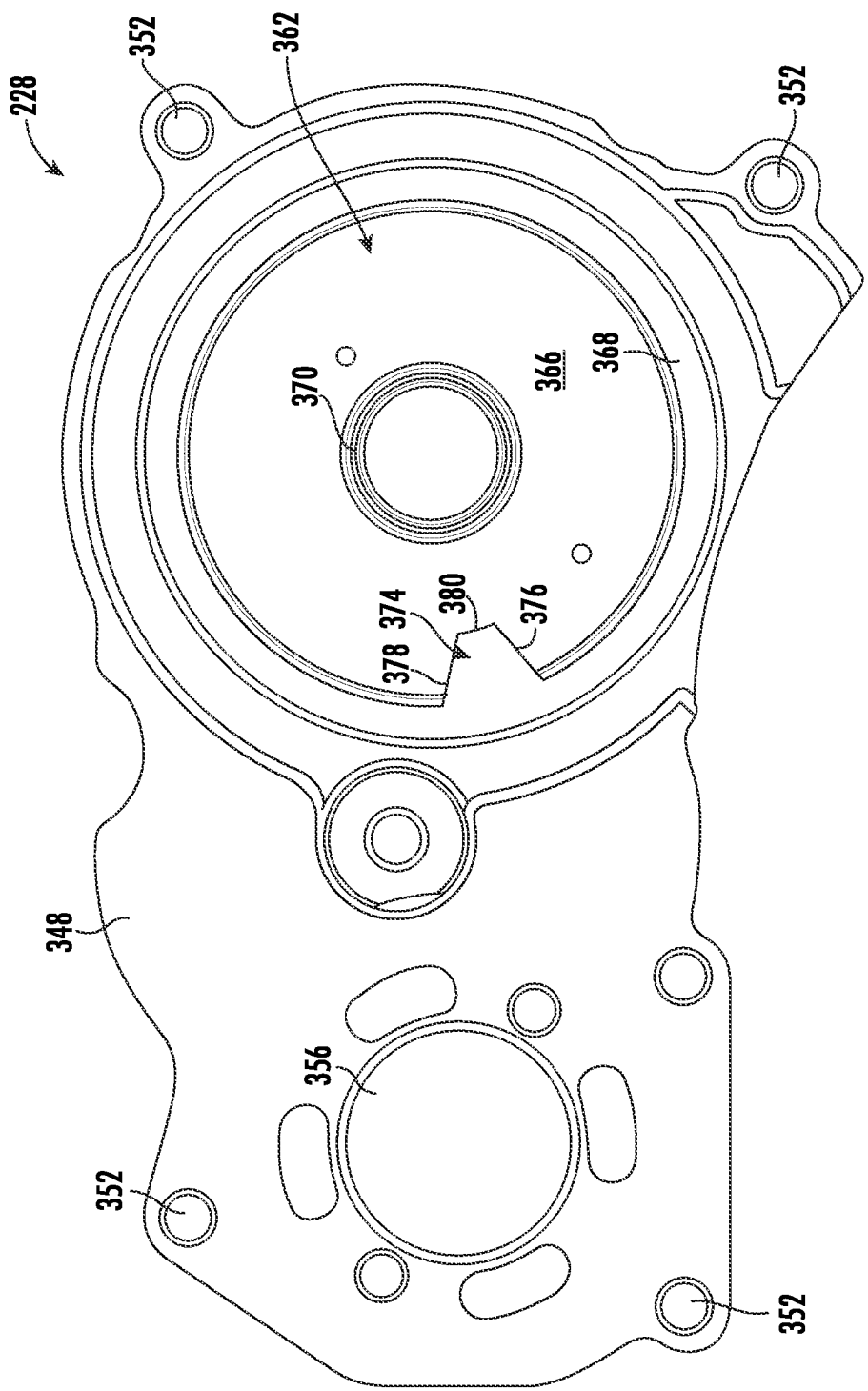
Figure 22:
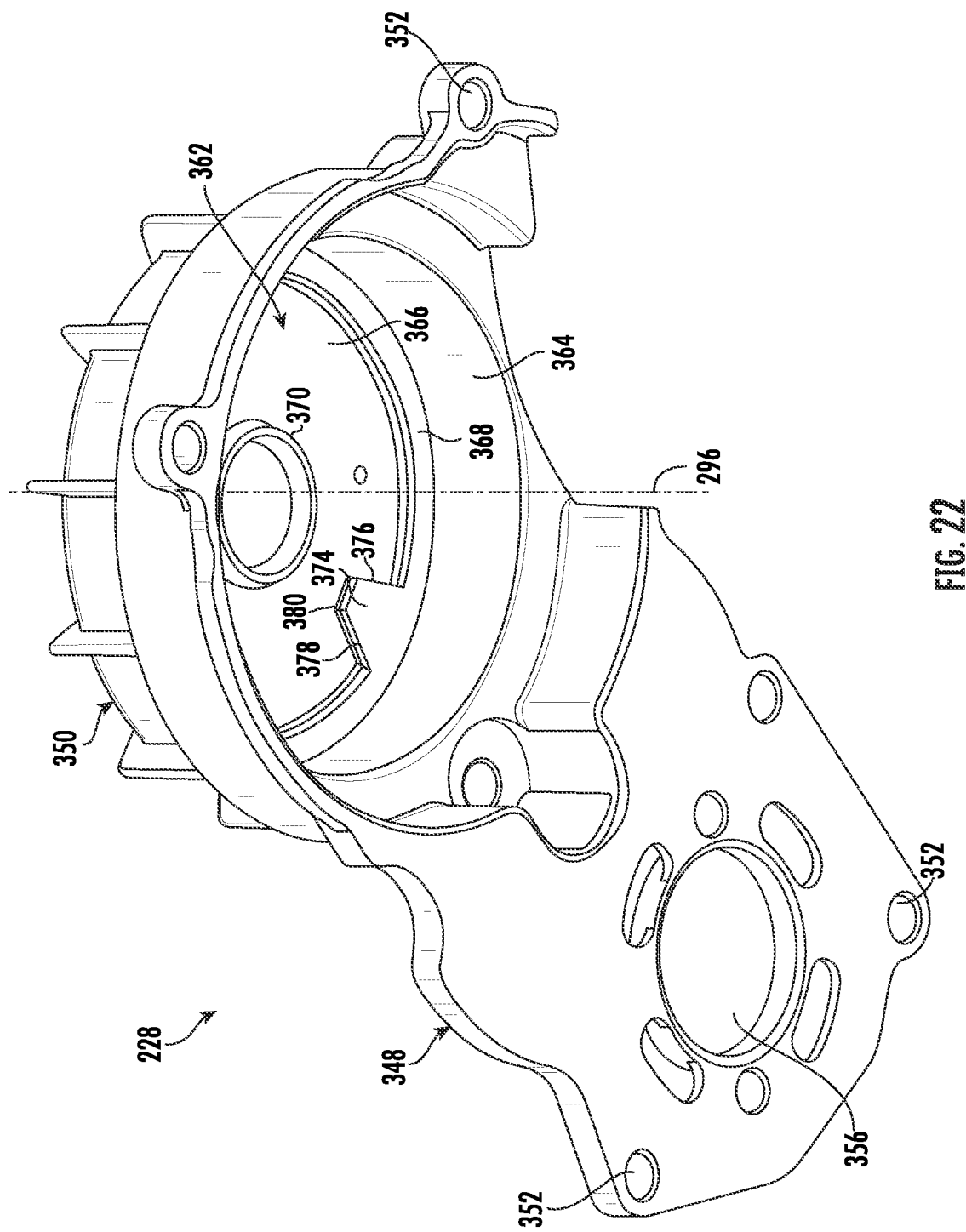
Figure 23:
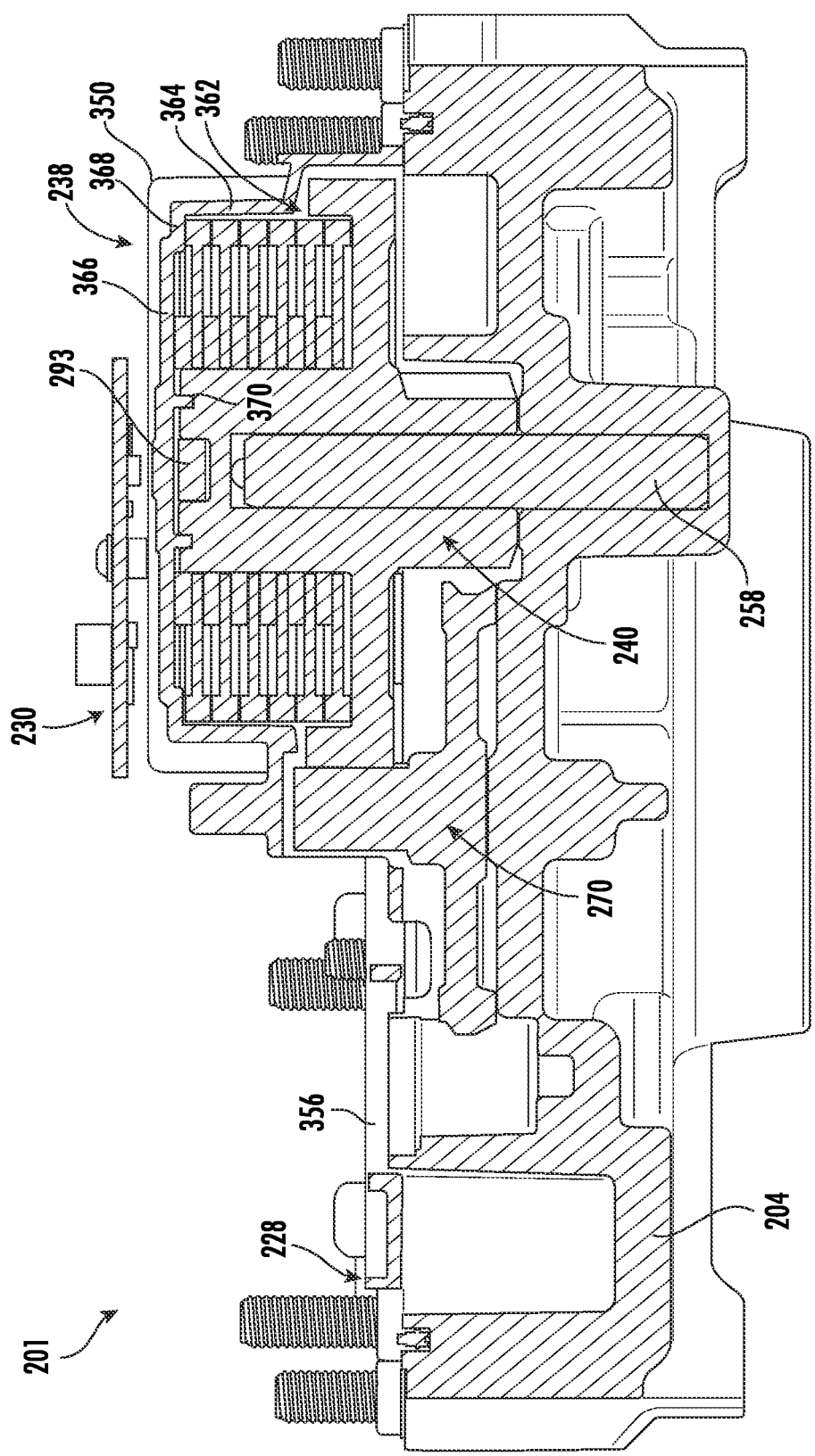
Figure 24:
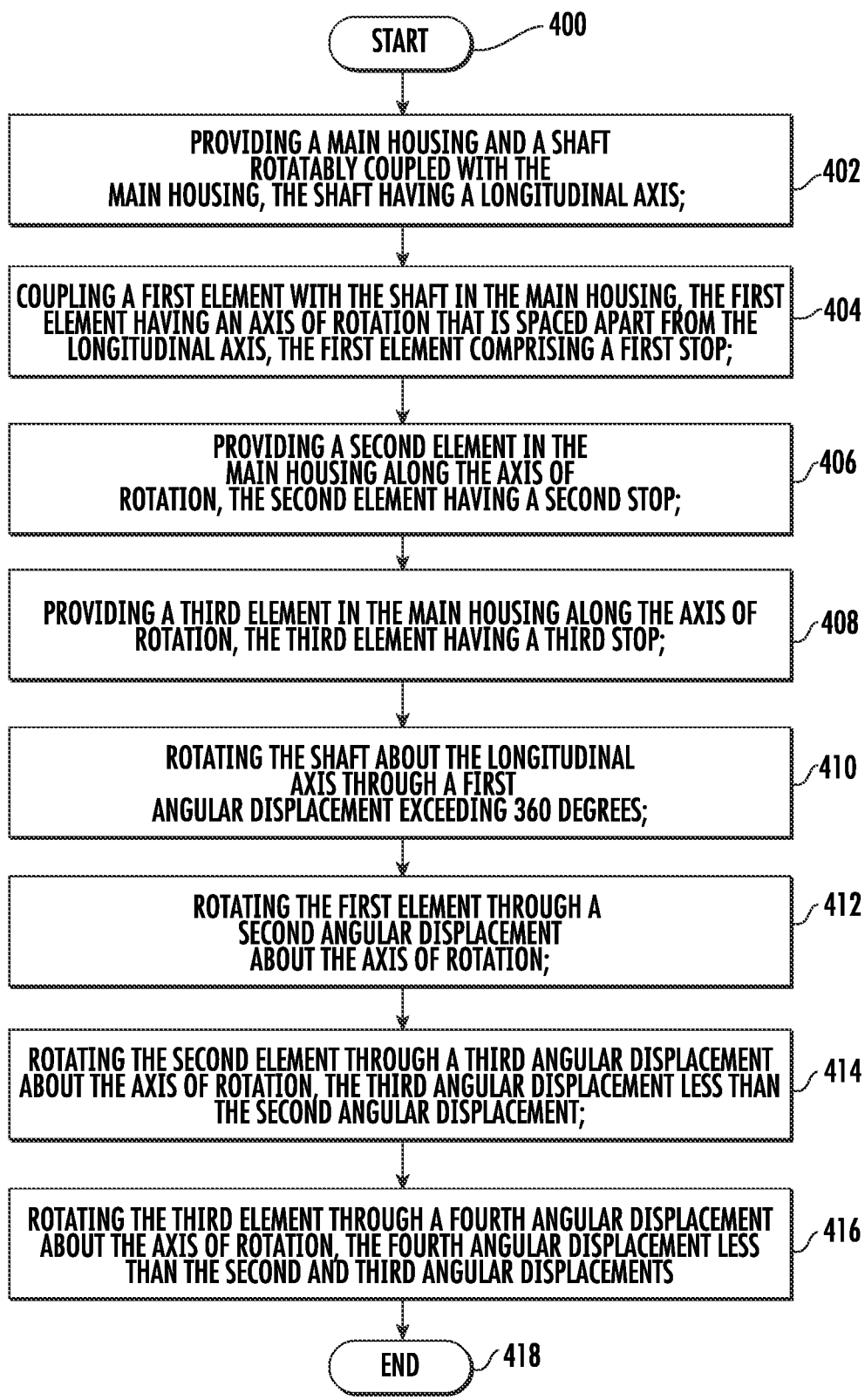
Figure 25:
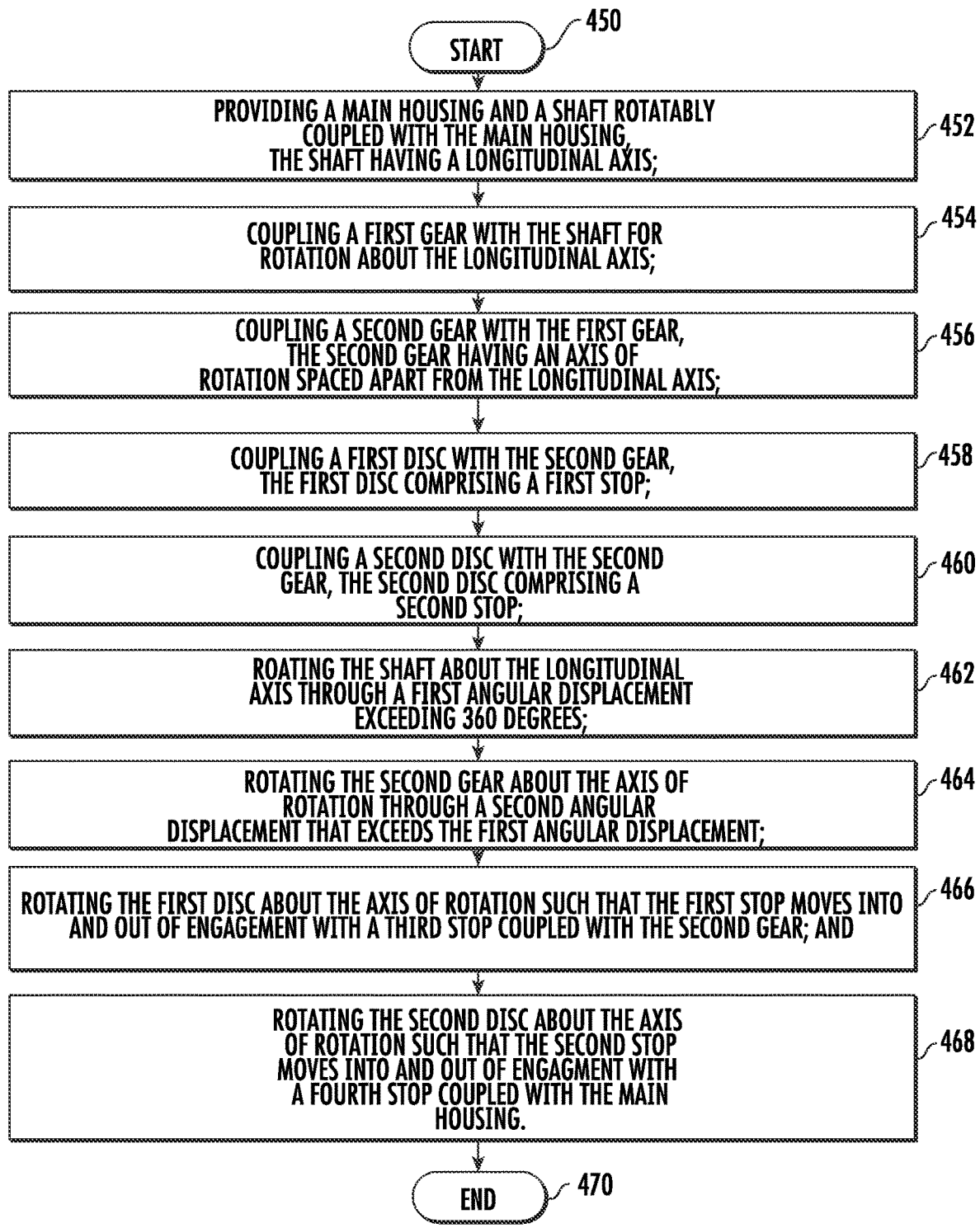
Figure 26:
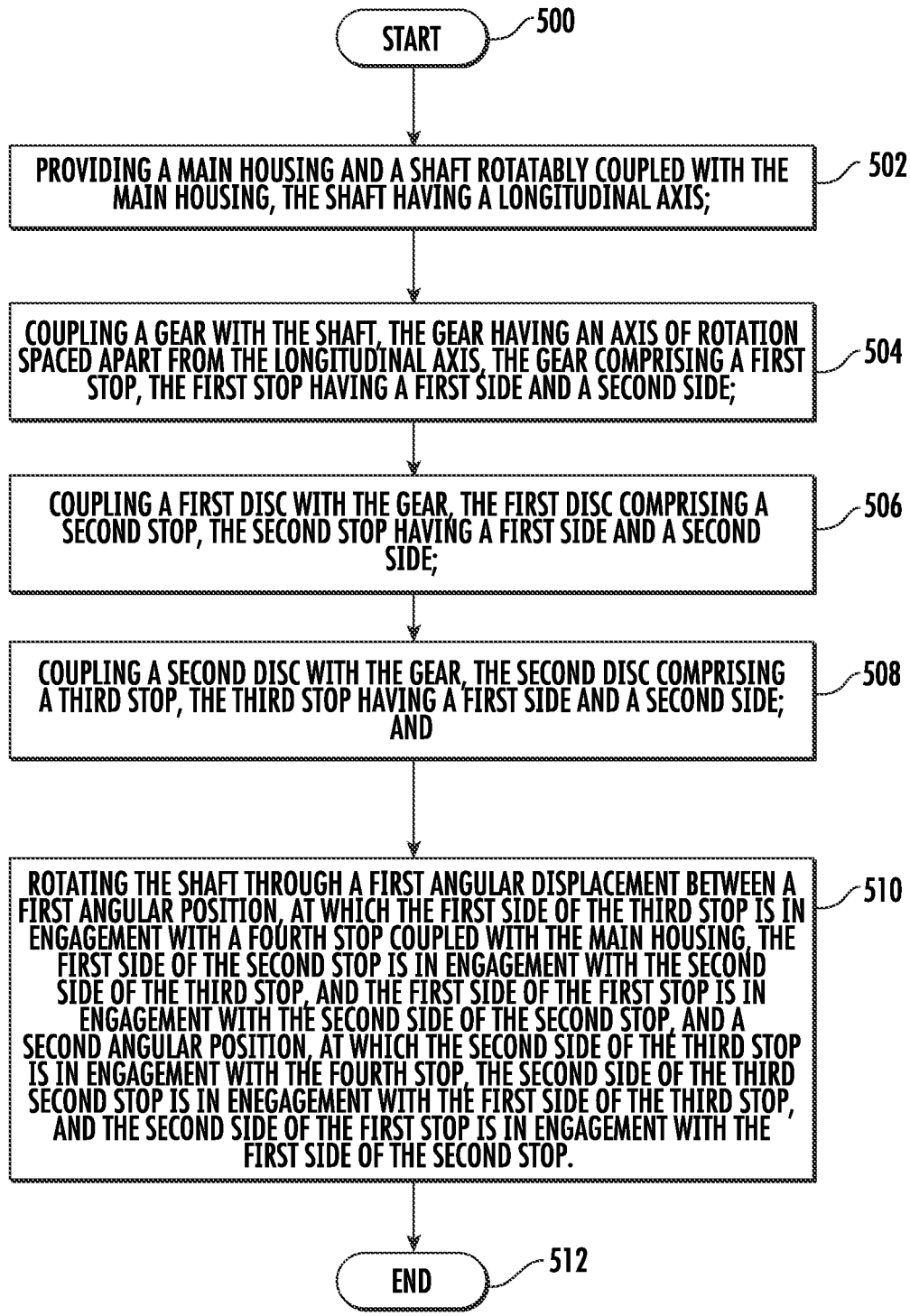

Having thus described some example embodiments in general terms, reference will now be made to the accompanying drawings, which are not necessarily drawn to scale, and wherein:

FIG. 1 is a side elevation view of a watercraft having a trolling motor assembly coupled to a front portion thereof in accordance with an embodiment of the present invention;

FIG. 2 is a schematic representation of a trolling motor assembly with which embodiments of the present invention may be used;

FIG. 3 is a block diagram of an example trolling motor assembly with which embodiments of the present invention may be used;

FIG. 4A is a perspective view of a trolling motor assembly in accordance with an embodiment of the present invention;

FIG. 4B is a perspective view of the trolling motor assembly of FIG. 4A with a portion of the main housing removed;

FIG. 4C is a perspective view of trolling motor assembly of FIG. 4A with the entire main housing removed;

FIG. 4D is a perspective view of a lower portion of the main housing of the trolling motor assembly of FIG. 4A with the other components of the trolling motor assembly removed;

FIG. 5 is a perspective view of a gear train and steering motor of a trolling motor assembly in accordance with an embodiment of the present invention;

FIG. 6 is a perspective view of the gear train of FIG. 5 with the steering motor and gear cover removed;

FIG. 7 is a section view of the gear train of FIG. 6 taken along the line 7-7 in FIG. 9;

FIG. 8 is a front elevation of the gear train of FIG. 6;

FIG. 9 is a top plan view of the gear train of FIG. 6;

FIGS. 10A and 10B are exploded perspective views of a stop assembly in accordance with an embodiment of the present invention;

FIG. 11 is a top plan view of a first rotational element of the stop assembly of FIGS. 10A and 10B in accordance with an embodiment of the present invention;

FIG. 12 is a section view of the first rotational element of FIG. 11 taken along the line 1212 in FIG. 11;

FIG. 13 is a perspective view of the first rotational element FIG. 11;

FIG. 14 is a perspective view of a second rotational element of the stop assembly of FIGS. 10A and 10B in accordance with an embodiment of the present invention;

FIG. 15 is a section view of the rotational element of FIG. 14 taken along the line 15-15 in FIG. 14;

FIG. 16 is another perspective view of the rotational element of FIG. 14;

FIG. 17 is a perspective view of a third rotational element of the stop assembly of FIGS. 10A and 10B in accordance with an embodiment of the present invention;

FIG. 18 is a section view of the rotational element of FIG. 17 taken along the line 18-18 in FIG. 17;

FIG. 19 is another perspective view of the rotational element of FIG. 17;

FIG. 20 is a perspective view of an inner housing that may be used with the stop assembly of FIGS. 10A and 10B in accordance with an embodiment of the present invention;

FIG. 21 is a bottom plan view of the inner housing of FIG. 20;

FIG. 22 is another perspective view of the inner housing of FIG. 20;

FIG. 23 is a cross-sectional view of the trolling motor assembly of FIG. 4A taken along the line 23-23 in FIG. 4B, wherein the steering motor and shaft also are removed;

FIG. 24 is a flowchart of an example method of operating a trolling motor assembly in accordance with an embodiment of the present invention;

FIG. 25 is a flowchart of an example method of operating a trolling motor assembly in accordance with another embodiment of the present invention; and FIG. 26 is a flowchart of an example method of operating a trolling motor assembly in accordance with yet another embodiment of the present invention.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Further, either of the terms "or" and "one of A and B," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

FIG. 1 illustrates an example watercraft 10 on a body of water 20. The watercraft 10 has a primary or main propulsion system indicated as motor 12 and a secondary propulsion system indicated as trolling motor assembly 14, which can be attached to, for example, a front portion of the watercraft. The trolling motor assembly 14 can include a trolling motor 16 that is typically submerged in the body of water 20 during use. The trolling motor assembly 14 can be used as a propulsion system to cause the watercraft to travel along the surface of the water 20. While the depicted embodiment shows the trolling motor assembly 14 attached to the front of the watercraft 10 and as a secondary propulsion system, example embodiments described herein contemplate that the trolling motor assembly 14 may be attached in any position or location on the watercraft 10 and/or may be the sole or primary propulsion system for the watercraft 10. Depending on the design and type of the trolling motor assembly 14, the trolling motor 16 may be a fuel-source powered motor (e.g., a gas, diesel, propane, hydrogen, etc. powered motor) or an electric motor. Moreover, steering may be accomplished manually via hand control, via foot control, and/or through use of a remote control. Additionally, in some cases, an autopilot may autonomously operate the trolling motor assembly 14.

Referring now also to FIG. 2, in various embodiments, the trolling motor assembly 14 can be electric and can be controlled by hand through an optional hand control rod 36 or through an optional foot pedal assembly 60. The trolling motor assembly 14 includes a main shaft 22 having a first end 24 coupled to a main housing 30 for housing, among other components, a wireless module, a second end 26 coupled to the trolling motor 16, and a steering assembly 64. The trolling motor 16 also includes a trolling motor housing 28 that is attached to the second end 26 of the shaft 22 and at least partially contains an internal propulsion motor 32 that mechanically and operatively connects to a propeller 34.

As shown in FIG. 1, in some embodiments, when the trolling motor 16 of the trolling motor assembly 14 is attached to the watercraft 10 and the associated propulsion motor 32 (or trolling motor housing 28) is submerged in the water, the propulsion motor 32 is configured to propel the watercraft to travel along the body of water 20. In addition to containing the propulsion motor 32, the trolling motor housing 28 may include other additional components, such as, for example, a sonar transducer assembly and/or other sensors or features (e.g., lights, temperature sensors, etc.), as shown in and described with respect to FIG. 3.

The main housing 30 of the trolling motor assembly 14 is connected or attached to the first end 24 of the shaft 22 and can include a hand control rod 36, such as a handle, that enables control of the propulsion motor 32 by a user, such as for example through angular rotation of the shaft 22 and associated housing 30 about axis A1. The main housing 30 can include processing circuitry, such as a processor and associated memory. The processing circuitry may be configured to control the steering assembly 64 based on a current operating mode and to process data received from the trolling motor housing 28, such as for example sonar return data generated by the sonar transducer assembly. In some embodiments, the hand control rod 36 may include a throttle, such as a thumb lever throttle or a rotating hand throttle, that is configured to control the speed of the trolling motor 32. In some embodiments, the trolling motor assembly 14 may be steered remotely using a handheld remote control 70, the foot pedal assembly 60, and/or other remote computing device (such as a remote marine electronics device—e.g., a device used for controlling other features of the watercraft). The illustrated trolling motor assembly 14 can also include an optional foot pedal assembly 60 that is enabled to control operation of the trolling motor assembly 14, as is known in the art. As described in more detail below, main housing 30 may also house one or more other motors in some embodiments used in connection with steering and trim adjustment.

The trolling motor assembly 14 may also include an attachment device 68 (e.g., a clamp, a mount, or a plurality of fasteners) to enable removable connection or attachment of the trolling motor assembly 14 to the watercraft 10. For example, the attachment device can be a releasable mount for releasably mounting the trolling motor assembly 14 to the watercraft 10. As described in greater detail herein, in various embodiments, certain components of the trolling motor assembly 14, such as shaft 22 and housing 28, may be configured for rotational movement relative to the watercraft about the shaft longitudinal axis A1, including, for example, rotational movement greater than 360 degrees.

The illustrated foot pedal assembly 60 can be electrically connected to the propulsion motor 32 via the main housing 30 by way of a cable 62. The foot pedal assembly 60 enables a user to steer and/or otherwise operate the trolling motor assembly 14 to control the direction and speed of travel of the watercraft 10. In an example embodiment, the foot pedal assembly 60 may provide steering commands, which in turn are used to cause the steering assembly 64 to steer the trolling motor housing 28 about axis A1 in a desired rotational direction. In some embodiments, though not shown, the foot pedal assembly 60 may be connected to the shaft 22 and utilize direct mechanical steering, such as through ropes or wires and the like, to cause steering or movement of the trolling motor housing 28. In still other embodiments, main housing 30 may include a motor operative to rotate shaft 22 about axis A1 in response to the above-mentioned steering commands. In such an embodiment, steering assembly 64 may not be provided. Further, depending upon the configuration of the foot pedal assembly 60, the foot pedal assembly 60 may include an electrical plug 66 that can be connected to an external power source.

Additionally or alternatively, the trolling motor assembly 14 may include a handheld remote control 70. The handheld control 70 may be wired or wirelessly connected to the main housing and provide steering commands, similar to the steering commands discussed above with reference to the foot pedal assembly 60. The handheld remote control 70 can be a dedicated control unit or alternatively can be a control interface executed on a user electronic device, such as for example a tablet computer, a smart phone, a laptop computer and the like.

Certain additional aspects of an example trolling motor assembly are discussed with reference to FIG. 3. As noted above, the trolling motor assembly 14 includes the main housing 30 and a trolling motor housing 28. Trolling motor assembly 14 can include a number of different modules or components, each of which may comprise any device or means embodied in either hardware, software, or a combination of hardware and software, and which are configured to perform one or more corresponding functions. For example, the main housing 30 can include a processor 110, a sonar signal processor 115, a memory 120, a user interface 138, a display 140, and one or more sensors (e.g., position sensor 145). Those of ordinary skill will readily recognize that the sonar signal processor 115 and the processor 110 can be combined into one or more processing components that can be distributed throughout the trolling motor assembly 14. The main housing 30 may also include one or more communication modules configured to communicate with one another in any of a number of different manners as part of a trolling motor communication system 100, including, for example, via a network 102. For instance, a communications element 108 can include a communication interface that includes any of a number of different communication backbones or frameworks. Main housing 30 can also include an electric motor 130 in communication with processor 110 and operative to turn a shaft that is mechanically linked (e.g., via one or more gears and/or other components) to shaft 22, such that the electric motor can cause shaft 22 and trolling motor housing 28 to rotate about axis A1 in response to signals received at processor 110 from a suitable control device, such as remote control 70 or foot pedal assembly 60. In some embodiments, the main housing 30 may include a trim assembly configured to cause the shaft to be displaced vertically (e.g., raise and lower the trolling motor with respect to the watercraft). Though FIG. 2 illustrates the main housing 30 at the top of the shaft, the main housing 30 or components of the main housing may be positioned elsewhere with respect to the shaft, such as in a trim and steering control housing that is attached to the shaft and configured such that the shaft rotates and/or vertically displaces with respect to the trim and steering control housing. An example trim and steering control housing that includes at least some of the components of the main housing 30 is illustrated in FIG. 4A, and described as a main housing 200.

The trolling motor housing 28 may in this embodiment include a trolling propulsion motor 32, a sonar transducer assembly 160, and one or more other sensors 165 (e.g., water temperature, current, etc.), which may each be controlled through the processor 110 as detailed herein. The trolling motor 16 provides the power supplied by the assembly 14 to propel the watercraft along the water. The sonar transducer assembly can be any selected and known sonar transducer assembly for generating sonar return data corresponding to an underwater environment relative to the watercraft. For example, the sonar transducer assembly 160 can employ one or more transducers to interrogate a selected underwater spatial region or area. The sonar transducer assembly is thus configured to transmit sonar signals into the underwater environment, receive sonar returns from the underwater environment, and convert the sonar returns into the sonar return data. The sonar return data is conveyed to one or more of the processors 110, 115 of the main housing 30, which serve to convert the sonar return data into sonar image data. The other sensors can provide any selected additional marine data for use by the trolling motor assembly 14.

The processor 110 and/or the sonar signal processor 115 may be any means configured to execute various programmed operations or instructions stored in memory (e.g., memory 120), such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to provide marine or sonar data indicative of the size, location, shape, etc. of objects detected by the system 100. For example, one or more of the processors 110, 115 may be configured to receive sonar return data from the sonar transducer assembly 160 and process the sonar return data to generate sonar image data for display to a user, such as via the display 140.

The communication module, such as the Wi-Fi module 108 and any associated communication interface, may be configured to enable connection to external devices and systems, such as for example to the network 102 and to a remote electronic device. In this manner, the processor 110 may retrieve stored data from a remote, external server via the network 102 in addition to or as an alternative to the onboard memory 120. In some embodiments, the sonar image data which is generated by one or more of the processors 110, 115 in the main housing 30 may be wirelessly transmitted via the network 102 by the Wi-Fi module 108 to the remote electronic device. The sonar image data can be displayed on a display unit of the remote electronic device.

In some embodiments, the processor 110 may be further configured to implement signal processing or enhancement features to improve the display characteristics of data or images, collect or process additional data, such as time, temperature, GPS information, waypoint designations, or others, or may filter extraneous data to better analyze the collected data. It may further implement notices and alarms, such as those determined or adjusted by a user, to reflect depth, presence or absence of fish, proximity of other watercraft, and the like. The memory element 120 can be configured to store instructions, computer program code, marine data, and other data associated with the sonar system in a non-transitory computer readable medium for subsequent use, such as by the processors 110, 115.

The position sensor 145 may be configured to determine the current position and/or location of the main housing 30. For example, the position sensor 145 may comprise a GPS or other location detection system. The display 140 may be configured to display images and may include or otherwise be in communication with a user interface 135 configured to receive input from a user. The display 140 may be, for example, a conventional LCD (liquid crystal display), a touch screen display, mobile device, or any other suitable display known in the art upon which images may be displayed. In any of the embodiments, the display 140 may present one or more sets of marine data or images generated from the one or more sets of data, such as from the sonar image data. In some embodiments, the display may be configured to present such marine data simultaneously, for example in split-screen mode. In some embodiments, a user may select any of the possible combinations of the marine data for display. Further, the user interface 135 may include, for example, a keyboard, keypad, function keys, mouse, scrolling device, input/output ports, touch screen, or any other mechanism by which a user may interface with the system.

Turning now to FIGS. 4A-4D, views of a main housing 200 of a trolling motor assembly 201 in accordance with one embodiment of the present invention are provided. In this regard, FIG. 4A is a perspective view of main housing 200. As shown, main housing 200 may comprise a first, or upper, portion 202 and a second, or lower, portion 204 that may be coupled together to form an enclosed space 206 (see FIG. 4B). Main housing 200 may be formed from any material suitable for use in a marine environment with which those of skill in the art are familiar, including a suitable plastic material. In some embodiments, for example, portions 202 and 204 may be manufactured from an injection-molded or rotationally-molded plastic material.

As described in more detail herein, various electronic and mechanical components used to operate a trolling motor assembly may be disposed in enclosed space 206. Wiring 208 (e.g., communications and power wires connected with a foot pedal assembly) may extend into enclosed space 206 via an aperture 210 defined in housing portion 202. Of course, in other embodiments, and as suggested above, any or all of the components of trolling motor assembly 201 may alternatively be included in a housing analogous to main housing 30, described above.

FIGS. 4B-4C are various perspective views of trolling motor assembly 201 with housing portion(s) 202 and/or 204 removed. Also, in FIG. 4C, the upper portion of shaft 214 is not shown. FIG. 4D is a perspective view of housing portion 204 with the other components of trolling motor assembly 201 removed. Housing portion 204 in this example also defines an aperture 212 sized to receive a rotatable shaft 214 therein. Shaft 214 defines a longitudinal axis 216 (FIG. 4A). An upper portion of shaft 214 may be coupled with a trim assembly (not shown in these figures). As those of skill in the art will appreciate, such a trim assembly may allow a user to translate (e.g., raise and lower) shaft 214 (and its corresponding propulsion motor) along longitudinal axis 216 relative to housing 200. Those of skill in the art also will appreciate that, although not shown in the figures, the distal end of shaft 214 may be coupled with a trolling motor housing, as also described above.

Within enclosed space 206, housing portion 204 may define a recessed area 220 at which the trim assembly and shaft 214 join together for mutual rotation about the longitudinal axis 216 of the shaft. As shown, for example, the trim assembly may comprise a gear 222 that defines an aperture 224 through which shaft 214 passes. Thus, gear 222 and the other components of trim assembly can rotate about longitudinal axis 216.

Certain other electronic and mechanical components, including processor(s) (e.g., processors 110, 115), memory (e.g., memory 120), an electric motor operative to turn a shaft (e.g., motor 130), and other gear(s) that mate with the gear 222 of the trim assembly and which are coupled with the shaft 214, may be disposed in an adjoining recessed area 226 of enclosed space 206. For instance, in the illustrated embodiment, a plurality of gears 227 that are operatively connected with gear 222 are covered by an inner housing 228, the underside of which is depicted in FIGS. 4C and 22. An angle sensor 230 that may be used to determine the angular position and/or relative angular displacement of shaft 214, as described in more detail below, is coupled with and disposed above housing 228. Also, a steering motor 232 is coupled with and disposed above housing 228. A shaft 234 of motor 232 (FIG. 4C) is coupled with one of the aforementioned gears 227, as described in more detail below. Operation of motor 232 thereby causes rotation of shaft 214 and, thus, steering of the trolling motor.

In various embodiments, a trolling motor assembly can comprise a rotation-limiting mechanism that prevents over-rotation of the assembly's shaft and/or lower unit, including its propulsion motor, but which may allow for rotation of the shaft and/or propulsion motor beyond a single revolution, or 360 degrees. In some embodiments, the rotation-limiting mechanism may comprise a plurality of rotatable elements with mating stop features. In various embodiments, the plurality of rotatable elements include discs arranged in a stacked formation about a common axis of rotation. In some embodiments, the plurality of rotatable elements also includes a gear that is part of a gear train in the main housing. The discs may be coupled with the gear, and the gear may also comprise a stop feature. Further, in some embodiments, the amount of permissible rotation is adjustable by adding or removing rotatable elements for large changes, and by adjusting the stop features (e.g., their width or angular extent) for fine tuning. Additionally, in some embodiments, the common axis of rotation is spaced apart from the longitudinal axis of the shaft, and one or more gears are coupled between the rotatable elements and the shaft to reduce the torque that may be applied to the stop features when the permissible angular rotation is reached. This may allow for the rotatable elements, and the entire stop assembly, to be thin, compact, and effective in various embodiments. As will be appreciated in view of the present disclosure, these features and others disclosed herein may be particularly desirable in electronically-driven trolling motors, though embodiments of the present invention may be used with cable-driven or hybrid drive trolling motors, too.

Although an example embodiment is shown and described in detail below comprising a plurality of discs that engage with one another within main housing 200 at predetermined angular positions of a gear assembly relative to main housing 200, those of skill in the art will appreciate that the present invention is not so limited. In various example embodiments, the rotation-limiting mechanism may comprise structures other than discs with projecting stops that cooperate to limit rotational motion of a gear or gear assembly and shaft (and, correspondingly, the assembly's lower unit). Likewise, although in one example the rotation-limiting mechanism may comprise a plurality of discs disposed on a particular gear in main housing 200, it will be appreciated that a similar structure could be disposed on one or more other component(s) that are coupled for rotational movement with the assembly's lower unit, such as but not limited to the shaft or another rotatable element or gear. It will be appreciated that all such embodiments are contemplated within the scope of this disclosure.

In this regard, an example rotation limiting mechanism that is included in the trolling motor assembly 201 is described with reference to FIGS. 5-23. To facilitate discussion, certain components of the trolling motor assembly 201 are not shown in these figures, such as the trolling motor housing, main housing 200, shaft 214, trim assembly (other than gear 222), a foot pedal assembly, and power and communications wiring. FIG. 5 is a perspective view of a gear train 236 and steering motor 232 of trolling motor assembly 201. FIGS. 6-9 are various views of gear train 236 with inner housing 228 removed. FIGS. 10A and 10B are exploded perspective views of a stop assembly 238 in accordance with an embodiment of the present invention. FIGS. 11-13 are plan, section, and perspective views of a first rotational element, in this case, a gear 240, of the stop assembly 238. FIGS. 14-16 are perspective and section views of a second rotational element, in this case, a disc 242, of the stop assembly 238. FIGS. 17-19 are perspective and section views of a third rotational element, in this case, a disc 244, of the stop assembly 238. FIGS. 20-22 are perspective and plan views of inner housing 228, which in this embodiment is a component of stop assembly 238. FIG. 23 is a section view of trolling motor assembly 201 showing inner housing 228 coupled with lower housing portion 204.

As noted above, the illustrated example of trolling motor assembly 201 comprises a gear train 236. As an initial matter, those of skill in the art will appreciate that any suitable gear or gear combination may be used, including but not limited to straight cut, helical, and bevel gears in any suitable or desired combination in various embodiments. Additionally, some embodiments of trolling motor assembly 201 may not comprise a gear train at all.

However, in this embodiment, gear train 236 comprises the plurality of gears 227 mentioned above and gear 222 that is coupled with shaft 214. In various embodiments, use of gear train 236 may, among other things, reduce the torque applied to the stop features when a rotational limit is reached and reduce the torque required of steering motor 232 in steering the trolling motor. The gears of gear train 236 may be formed of a metal material suitable for use in marine environments, though other materials may be used.

More particularly, the plurality of gears 227 includes gear 240, as noted above, which includes two sets of straight cut, radially-extending teeth 246, 248 respectively defined on an outer surface of middle and lower cylindrical portions 250, 252 of gear body 254. As shown, cylindrical portions 250, 252 have different diameters. Gear body 254 defines a bore 256 that receives one end of a shaft 258 (FIG. 4C), the other end of which is received in a corresponding bore defined in housing portion 204. Gears 227 also include a gear 260 that comprises a cylindrical gear body 262 and a plurality of straight-cut, radially-extending gear teeth 264 defined on an outer surface of body 262. As shown, gear teeth 264 mesh with both teeth 248 of gear 240 and radially-extending gear teeth 266 defined on an outer surface of gear 222. Gear 260 also defines a bore that receives one end of a shaft 268, the other end of which is received in a corresponding bore of housing portion 204. Also included in gear train 236 is a gear 270. Similar to gear 240, gear 270 comprises a gear body 272 that defines cylindrical portions 274, 276 of different diameters. A set of straight-cut, radially-extending teeth 278 is defined on an outer surface of cylindrical portion 276, and a set of helical cut, radially-extending teeth 280 is defined on an outer surface of cylindrical portion 274. Gear teeth 278 mesh with gear teeth 246 of gear 240. Gear teeth 280 mesh in a parallel configuration with helical cut, radially extending teeth 282 of a gear 284. As with gears 240 and 260, gear body 272 of gear 270 defines a bore that receives one end of a shaft 286, the other end of which is received in a corresponding bore defined in housing portion 204. Gear 284 comprises a body portion 288 that defines a bore that receives shaft 234 of steering motor 232.

Those of ordinary skill in the art can select the dimensions and configurations of gears 222, 240, 260, 270, and 284 to achieve any gear ratio needed or desired between any two gears. In the illustrated embodiment, the gear ratio between gear 240 and gear 222 may be 7:1, though this is not required. In other words, for every one rotation of gear 222 (and correspondingly, of the trim assembly, shaft 214, and the lower unit), gear 240 may rotate seven times.

As will be appreciated, steering motor 232 and gear train 236 may be used to cause rotation of shaft 214 in response to a user's control input. In this regard, in one embodiment, one or more sensors (e.g., magnetic sensors) may be disposed in main housing 200 to obtain information regarding the rotation of at least one of the gears in gear train 236, and this information may be provided to a processor (e.g., processor 110). For instance, as shown in FIG. 6, an upper cylindrical portion 290 of gear 240 defines an aperture 292 having a square cross-section in which a magnet 293 (FIG. 23) may be received for rotation about the axis of rotation of gear 240. As shown in FIGS. 4B and 5, angle sensor 230 is disposed on inner housing 228 directly above the magnet in aperture 292. Angle sensor 230 may comprise a magnetic sensor operative to determine the amount by which gear 240 has rotated and, based on knowledge of the gear ratios between the various gears in gear train 236, also the amount by which the other gears in gear train 236 have rotated. A similar magnetic sensor arrangement may be disposed in the foot pedal assembly (e.g., foot pedal assembly 60) and may be used to determine the position of the foot pedal. This information may likewise be provided to the processor.

The motor 232 may be in operative electronic communication with the processor to drive the shaft 214 and gears 284, 270, 240, 260, and 222 in response to control input received at the processor. For example, teeth 282 of gear 284 mesh with teeth 280 of gear 270, and when motor 232 is operated to rotate shaft 234 and gear 284, such rotation causes corresponding rotation of gear 270. Likewise, because teeth 278 of gear 270 mesh with teeth 246 of gear 240, rotation of gear 270 causes rotation of gear 240. Further, because teeth 248 of gear 240 mesh with teeth 264 of gear 260, rotation of gear 240 causes rotation of gear 260. Finally, because teeth 264 of gear 260 also mesh with teeth 266 of gear 222, rotation of gear 260 causes rotation of gear 222 and, along with it, the remainder of the trim assembly. Thus, operation of motor 232 may rotate the shaft 214 and, by extension, the trim assembly.

In one embodiment, when a user changes the position of the foot pedal assembly to indicate a desired change in direction of the propulsion motor, information regarding the position of the foot pedal may be fed to the processor. The processor may cause the motor 232 to operate and rotate the shaft 234 which, as described above, causes rotation of the gear train 236, the trim assembly, shaft 214, and ultimately the trolling motor housing and propulsion motor. As the shaft 214 rotates, the magnet disposed in aperture 292 likewise will rotate, and the sensor 230 may provide information regarding such rotation to the processor as part of a feedback loop. The processor may then use this information to determine the amount by which shaft 214 and the trolling motor housing have rotated to also determine whether the propulsion motor has reached the position indicated by the user, or whether continued operation of the motor 232 is required to bring the propulsion motor to the position indicated by the user.

As noted above, in this embodiment of a trolling motor assembly, the rotation limiting mechanism includes a stop assembly 238. This particular embodiment of stop assembly 238 comprises inner housing 228 and a plurality of rotational elements, e.g., gear 240 and a plurality of discs 242a-242f and 244a-244f These rotational elements are shown in FIGS. 10A and 10B, which are exploded views of stop assembly 238 with inner housing 228 removed.

In this example, the plurality of discs 242a-242f and 244a-244f are coupled with upper cylindrical portion 290 of gear body 254 of gear 240. Specifically, each disc 242a-242f and/or 244a-244f defines an internal aperture 294 having a diameter slightly larger than the diameter of upper cylindrical portion 290, and discs 242a-242f and 244a-244f are stacked in an alternating configuration over cylindrical portion 290 so that cylindrical portion 290 passes through each aperture 294. Preferably, the relative dimensions of cylindrical portion 290 and aperture 294 are selected such that each disc 242 and/or 244 can rotate relative to each other disc 242 and/or 244 and relative to gear 240. Each disc 242, 244 may rest on the rotational element beneath it by the force of gravity. It will be appreciated that, in some embodiments, any of discs 242a-242f and 244a-244f may rotate with gear 240 and/or with one another until a rotational stop is encountered, as described in more detail herein.

Gear 240 defines an axis of rotation 296, and in this embodiment, each aperture 294 is centered on axis of rotation 296. Thus, in this embodiment, the axis of rotation 296 of gear 240 also is the axis of rotation of each disc 242 and/or 244. Of course, the arrangement shown in FIGS. 10A and 10B is not required in all embodiments, and one or more of discs 242a-242f and 244a-244f could be coupled with a different (e.g., lower) portion of gear 240 or another gear or another rotational element in other embodiments. Also, while the axis of rotation of each disc 242 and/or 244 is spaced apart from the longitudinal axis 216 of shaft 214 in this embodiment, in other embodiments these axes could be the same. Again, in some embodiments, the stop assembly 238 need not include a gear (e.g., gear 240), and discs 242a-242f and/or 244a-244f could be coupled with another disc.

Certain aspects of gear 240, discs 242 and 244, and inner housing 238 are described in more detail below. First, gear 240 is shown in FIGS. 11-13. As described above, body 254 of gear 240 comprises a lower cylindrical portion 252, a middle cylindrical portion 250, and an upper cylindrical portion 290. In the illustrated embodiment, middle cylindrical portion 250 defines an annular recess 298 proximate upper cylindrical portion 290 in which some or all of the discs 242, 244 may be received. As those of skill in the art will appreciate, annular recess 298 is not required, but where provided it may help reduce the height of stop assembly 238. Thus, the discs 242, 244 may have a diameter that is slightly less than the diameter of annular recess 298, and their apertures 294 may be slightly larger than upper cylindrical portion 290. Middle cylindrical portion 250 also defines an annular lip 300 that extends about the circumference of annular recess 298.

Middle cylindrical portion 250 defines a bottom surface 302 and a top surface 304. Further, gear body 254 comprises a stop 306. The size, shape, and orientation of stop 306 will vary in various embodiments and may depend on the amount of rotation beyond 360 degrees it is desired that shaft 214 rotate; the size, shape and orientation of other stop(s) in the stop assembly 238; and the desired compactness of stop assembly 238, among other considerations. In this example, however, stop 306 comprises a thin, flat member that projects upward from top surface 304 and extends radially outward from upper cylindrical portion 290. The cross-sectional shape of stop 306 resembles a truncated triangle that, at its interface with upper cylindrical portion 290, extends through an angle α of about thirty (30) degrees. Stop 306 defines a first lateral face 308 that extends perpendicularly to top surface 304 and, on its opposite side, a second lateral face 310 that also extends perpendicularly to top surface 304. The complementary angle β in this embodiment is about three hundred and thirty (330) degrees. One of ordinary skill in the art can select suitable angles α and β based on the amount by which it is desired that a trolling motor housing be allowed to rotate beyond 360 degrees, and thus the relative size of stop 306 may be varied to achieve particular angular displacements of the trolling motor housing. Likewise, the shape of stop 306 when viewed in plan can be any suitable shape, including circular, square, triangular, etc.

In one embodiment, the shape of stop 306 may be selected to mate with or be complementary to the shape of a stop on the disc 242 or 244 that is located adjacent surface 304. Thus, for example, the angles of lateral faces 308, 310 relative to a radially-extending line centered on stop 306 may be the same as the angles of the lateral faces of such other stop relative to a radially-extending line centered on such other stop. As such, in various embodiments, the lateral faces of stop 306 and such other stop are substantially parallel when the stops come into engagement with one another. Stop 306 in this embodiment does not extend the entire radial distance between upper cylindrical portion 290 and lip 300, but it can in other embodiments. Further, stop 306 can be located on bottom surface 302 in other embodiments where discs 242, 244 are located proximate lower cylindrical portion 252.

Next, a disc 242 (e.g., one of the discs 242a-242f discussed above) is shown in FIGS. 14-16. Disc 242 comprises a thin, flat plate defining a central aperture 294 and having a top surface 312 and a bottom surface 314. Disc 242 as shown is generally annular in shape, but that is not required in all embodiments. Disc 242 in this example further comprises a circumferential lip 316 that projects from top surface 312 and from bottom surface 314. Thereby, disc 242 defines a recessed area 318 above top surface 312 bounded by lip 316 and a recessed area 320 below bottom surface 314 also bounded by lip 316. As those of skill in the art will appreciate, recessed area 318 and lip 316 are not required in all embodiments, but particularly where a stop assembly 238 includes discs 244 stacked on discs 242 (as described herein), providing recessed area 318 and lip 316 may help reduce the height of stop assembly 238.

Further, disc 242 defines a stop 322. The size, shape, and orientation of stop 322 will vary in various embodiments and may depend on the amount of rotation beyond 360 degrees it is desired that shaft 214 rotate; the size, shape and orientation of other stop(s) in the stop assembly 238; and the desired compactness of stop assembly 238, among other considerations. In this example, though, stop 322 comprises a thin, flat member that projects upward from top surface 312 and extends radially outward from circumferential lip 316. The cross-sectional shape of stop 322 in this embodiment resembles a truncated triangle, and it in many respects is analogous to stop 306. Thus, at its interface with circumferential lip 316, stop 322 likewise extends through an angle of about thirty (30) degrees, and the portion of circumferential lip 316 that does not engage stop 322 extends through an angle of about three hundred and thirty (330) degrees, though again these angles may vary as needed or desired to achieve particular angular displacements of the trolling motor housing. Stop 322 defines a first lateral face 324 that extends perpendicularly to top surface 312 and, on its opposite side, a second lateral face 326 that also extends perpendicularly to top surface 304. Again, the angles of lateral faces 324, 326 relative to a radially-extending line centered on stop 322 may be the same as the corresponding angles of the lateral faces of another stop that is configured to engage stop 322 (on either the side proximate top surface 312 or the bottom surface 314). As such, in various embodiments, the lateral faces of stop 322 and such other stop(s) are substantially parallel when the stops come into engagement with one another.

The height of stop 322 is the same as the height of circumferential lip 316 in this embodiment, but as noted below that is not required in all embodiments. In this embodiment, though, when one disc 242 is stacked on top of another disc 242, stops 322 do not interfere with one another. As shown, stop 322 extends both above top surface 312 and below top surface 314. While the portions of stop 322 that extend above and below top and bottom surfaces 312 and 314 are aligned and have the same shape in this embodiment, that is not required. Again, the shape of stop 322 when viewed in plan can be any suitable shape, including circular, square, triangular, etc. As suggested above, the shape of stop 322 may be selected to mate with or be complementary to the shape of stop 306 on gear 240 or a stop located on the disc 242 or 244 that is located adjacent either surface 312 or 314. Stop 322 in this embodiment does not extend the entire radial distance between upper circumferential lip 316 and aperture 294, but it can in other embodiments.

In various embodiments, disc(s) 242 that are included in a stop assembly 238 may be stacked on gear 240 and/or on another disc 242 and/or 244. Thus, for example, when a disc 242 is disposed on a gear 240, a bottom surface 328 of circumferential lip 316 on disc 242 may engage or rest on top surface 304 of gear 240. Also, for example, when a disc 242 is disposed on another disc 242, bottom surface 328 of circumferential lip 316 on one disc 242 may engage or rest on a top surface 330 of circumferential lip 316 on the other disc 242. In the latter example, this may be the case even where a disc 244 is disposed or stacked between two discs 242, as described elsewhere herein.

As noted above, the rotational elements of stop assembly 238 preferably are configured to be rotatable relative to one another until a limit on the angular displacement of shaft 214 is encountered. In one embodiment, to facilitate such relative rotation between a disc 242 and a gear 240, the radial width of circumferential lip 316 may be slightly less than the radial distance, on gear 240, between stop 306 and lip 300. Also, the distance that lip 316 projects below bottom surface 314 (or, alternatively, the depth of recessed area 320) may be slightly greater than the distance that stop 306 on gear 240 projects above top surface 304. Thus, as best seen in FIG. 7, a disc 242 may be disposed level on top surface 304 of gear 240 as long as stops 306 and 322 are sufficiently angularly offset from one another. In some embodiments, the distance that lip 316 projects below bottom surface 314 (or, alternatively, the depth of recessed area 320) is equal to the distance that lip 316 projects above top surface 312 (or alternatively, the depth of recessed area 318), although this is not required.

Additionally, in some embodiments, a bead 332 may be disposed on bottom surface 328 of circumferential lip 316 of disc 242. Bead 332 may be annular in shape and may be continuous, as shown in FIG. 16, or discontinuous about bottom surface 328. In this example, bead 332 has a smaller surface area than that of bottom surface 328 of lip 316, and thus it may serve to reduce friction between a disc 242 and either the top surface 304 of gear 240 and/or top surface 330 of circumferential lip 316 of another disc 242.

When a disc 242 is stacked or disposed on a gear 240, the stop 306 on gear 240 is rotatable into and out of engagement with stop 322 on disc 242. In particular, when gear 240 is rotated in a clockwise direction relative to an adjacent disc 242, lateral face 310 of stop 306 will come into contact with lateral face 324 of stop 322. When gear 240 is rotated in a counterclockwise direction relative to an adjacent disc 242, lateral face 308 will come into contact with lateral face 236 of stop 322.

Next, a disc 244 (e.g., one of the discs 244a-244f discussed above) is shown in FIGS. 17-19. In this embodiment, disc 244 also comprises a thin, flat plate defining a central aperture 294 and having a top surface 334 and a bottom surface 336. Disc 244 as shown is generally annular in shape, but that is not required in all embodiments.

Disc 244 also defines a stop 338. Again, the size, shape, and orientation of stop 338 will vary in various embodiments and may depend on the amount of rotation beyond 360 degrees it is desired that shaft 214 rotate; the size, shape, and orientation of other stop(s) in the stop assembly 238; and the desired compactness of stop assembly 238, among other considerations. In this example, though, stop 338 comprises a thin, flat member that projects radially outward from a circumferential face 340 of disc 244.

Similar to stops 306 and 322 discussed above, the cross-sectional shape of stop 338 in this embodiment resembles a truncated triangle. Likewise, at its interface with circumferential face 340, stop 338 extends through an angle of about thirty (30) degrees, and the portion of circumferential face 340 that does not engage stop 338 extends through an angle of about three hundred and thirty (330) degrees, though again these angles may vary as needed or desired to achieve particular angular displacements of the trolling motor housing. Stop 338 defines a first lateral face 342 that extends perpendicularly to top surface 334 and, on its opposite side, a second lateral face 344 that also extends perpendicularly to top surface 334. Again, the angles of lateral faces 342, 344 relative to a radially-extending line centered on stop 338 may be the same as the corresponding angles of the lateral faces of another stop that is configured to engage stop 338. As such, in various embodiments, the lateral faces of stop 338 and such other stop(s) are substantially parallel when the stops come into engagement with one another. Again, though, the shape of stop 338 when viewed in plan can be any suitable shape, including circular, square, triangular, etc. As suggested above, the shape of stop 338 may be selected to mate with or be complementary to the shape of stop 306 on gear 240 or a stop located on the disc 242 that is located adjacent either surface 334 or 336.

In this embodiment, the thickness of stop 338 is the same as the thickness of the remainder of disc 244, but that is not required in all embodiments. In various embodiments, the thickness of disc 244, including that of stop 338, is less than the area between two stacked discs 242. In other words, the thickness of disc 244, including that of stop 338, may be less than the thicknesses of the combination of recessed areas 318 and 320. Additionally, in various embodiments, the thickness of stop 338 is greater than the thickness of stops 322 and 306. Thus, for instance, where a disc 244 is positioned between two discs 242, the portions of stops 322 that are located in the area between discs 242 both can be rotated into and out of engagement with the single stop 338.

Again, in various embodiments, disc(s) 244 that are included in a stop assembly 238 may be stacked on gear 240 and/or on another disc 242 and/or 244. For example, when a disc 244 is disposed on a gear 240, bottom surface 336 of disc 244 may engage or rest on top surface 304 of gear 240, as long as stops 338 and 306 are sufficiently angularly offset. Also, in the example embodiment, the radial distance between the axis of rotation 296 of disc 244 and surface 340 preferably is less than the radial distance between the axis of rotation 296 of disc 242 and the internal edge 346 of stop 322 on disc 242. Accordingly, when a disc 244 is disposed on a disc 242, bottom surface 336 of disc 244 may engage or rest on top surface 312 of disc 242, again as long as stops 338 and 322 are sufficiently angularly offset.

In the example embodiment, a disc 244 disposed between two discs 242 may be rotated independently of either disc 242 until stop 338 encounters another stop 322. The lateral faces 324 of discs 242 are rotatable into and out of engagement with lateral face 344 of disc 244, and vice versa. Similarly, the lateral faces 326 of discs 242 are rotatable into and out of engagement with lateral face 342 of disc 244, and vice versa. To facilitate and/or ease such rotation, in various embodiments, discs 242, 244 may be formed of different materials. For instance, disc 242 may be formed of a plastic material suitable for use in marine environments, and disc 244 may be formed of a metal material suitable for use in marine environments, or vice versa. Although not required, providing discs 242 and 244 formed of different materials may reduce the coefficient of friction between them and facilitate their rotation relative to one another.

As those of skill in the art will appreciate, in various embodiments, components of the stop assembly may be configured to achieve various degrees of compactness and various amounts of angular displacement of shaft 214, as needed or desired for a particular application. Thus, various combinations and modifications of the rotational elements described herein may be used in various embodiments. For example, the illustrated embodiment of stop assembly 238, which includes gear 240 and a plurality of discs 242 and 244, defines annular recess 298 in gear 240 and recessed areas 318, 320 in discs 242 to help reduce the overall height of stop assembly 238 while also permitting a greater angular displacement of shaft 214 before a rotational limit is encountered. However, this particular alternating arrangement of discs 242 and 244 coupled with a gear 240, as depicted in FIGS. 10A-10B, is not required in all embodiments.

For instance, an embodiment of stop assembly 238 may not include any discs 244 and instead comprise only a disc or discs 242. This could be done either alone or in combination with a gear 240 or another suitable rotational element, and another stop coupled with main housing 200. In such embodiments, the stops 322 on some or all of the plurality of discs 242 may have a height or thickness that exceeds the height or thickness of circumferential lip 316, such that each stop 322 may engage with another stop 322 on another disc 242. Similarly, embodiments also are contemplated wherein a stop assembly 238 comprises only a disc or discs 244 and does not include any discs 242. Again, this could be done either alone or in combination with a gear 240 or another rotational element, and another stop coupled with main housing 200. In still other embodiments, both discs 242 and 244 may be used, but they may not be equal in number. However, in any such embodiment, the height of the resulting stop assembly may need to be taller than the illustrated embodiment to achieve the same amount of angular displacement permitted of shaft 214.

Turning now to FIGS. 20-23, as noted above, stop assembly 238 preferably includes at least one additional stop coupled with main housing 200. In the illustrated embodiment, such a stop is provided in connection with inner housing 228. As discussed above with reference to FIGS. 4B and 5-6, inner housing 228 partially covers gears 284, 270, 240, and 260.

In this embodiment, inner housing 228 comprises a base portion 348 and a dome-shaped cover 350 extending from base portion 348. A plurality of apertures 352 are defined in inner housing 228 and through which suitable fasteners (e.g., bolts as shown in FIGS. 4B and 23) may pass to secure inner housing 228 corresponding apertures defined in housing portion 204. Base portion 348 also defines an aperture 356 through which shaft 234 of steering motor 232 extends. Steering motor 232 is supported above aperture 356. As discussed above, angle sensor 230 is coupled with inner housing 228 on top of cover 350, e.g., via suitable fasteners coupled with bosses 358. In this embodiment, the axis of rotation of gear 240 and discs 242, 244 may pass through a center point 360 of cover 350.

As best seen in FIGS. 21-23, in this example, cover 350 defines a partially enclosed area 362 in which a stack of rotational elements including gear 240 and/or discs 242, 244 can be received. More particularly, when viewed in cross-section, cover 350 in this embodiment comprises a cylindrical body 364 and a top wall 366 coupled with the cylindrical body 364 via an annular stepped portion 368. Top wall 366 defines a projecting annular rib 370 that, when inner housing 228 is coupled with the other elements of stop assembly 238, is centered about the axis of rotation 296 of gear 240 and discs 242, 244. Gear 240 defines a corresponding groove 372 dimensioned to receive rib 370. Rib 370 thus serves to locate gear 240 (and discs 242, 244 coupled therewith) on inner housing 238 during assembly, and gear 240 is rotatable relative to rib 370 while rib 370 remains in groove 372.

Also, in this embodiment, inner housing 238 comprises a stop 374. Specifically, stop 374 comprises a thin, flat member that projects radially inward from stepped portion 368 on top wall 366. Again, however, the size, shape, and orientation of stop 374 will vary in various embodiments based on the factors described above, among others. In various embodiments, stop 374 need not be provided on stepped portion 368 and/or top wall 366 and instead could be coupled with wall 364. Also, in other embodiments, stop 374 is not located in inner housing 238 at all and is instead coupled with another portion of or structure within main housing 200.

Like stops 306, 322, and 338 discussed above, stop 374 in this embodiment resembles a truncated triangle when viewed in plan. Similarly, at its interface with stepped portion 368, stop 374 extends through an angle of about thirty (30) degrees, and the remainder of stepped portion 368 extends through an angle of about three hundred and thirty (330) degrees. Of course, these angles likewise may vary as needed or desired to achieve particular angular displacements of the trolling motor housing. Stop 374 defines a first lateral face 376 that extends perpendicularly to top wall 366 and a second lateral face 378 that also extends perpendicularly to top wall 366. Again, the angles of lateral faces 376, 378 relative to a radially-extending line centered on stop 374 may be the same as the corresponding angles of the lateral faces of another stop that is configured to engage stop 374. As such, in various embodiments, the lateral faces of stop 374 and such other stop(s) are substantially parallel when the stops come into engagement with one another. Again, though, the shape of stop 374 when viewed in plan can be any suitable shape, including circular, square, triangular, etc. in other embodiments. As suggested above, the shape of stop 374 may be selected to mate with or be complementary to the shape of stop 306 on gear 240, and/or stops 322 and 338 respectively located on discs 242 and 244.

In various embodiments, the dimensions of cover 350 and partially enclosed space 362 of inner housing 238 may be selected to accommodate the dimensions of the other rotational elements of stop assembly 238 and to place stop 374 in a position that it will interfere with rotation of a rotational element of stop assembly 238. Thus, the dimensions of cover 350 and partially enclosed space 362 may depend on the number of discs 242 and/or 244 that are included in stop assembly 238 and/or on the height of upper cylindrical portion 290 of gear 240 (where included). As best seen in FIG. 23, for example, cover 350 and partially enclosed space 362 are sized such that, when inner housing 228 is coupled with housing portion 204, the annular rib 370 is disposed within groove 372 and top wall 366 is disposed slightly above the top rotational element in stop assembly 238 (here, disc 244f). Further, the dimensions of cover 350 and enclosed space 362 are selected so that, when inner housing 228 is coupled with housing portion 204, stop 374 is located to interfere with the rotation of stop 338 on disc 244f at predetermined angular positions about axis of rotation 296. Specifically, in this embodiment, when stop assembly 238 is assembled, lateral face 342 of stop 338 on disc 244f is rotatable into and out of engagement with lateral face 376 of stop 374, and lateral face 344 of stop 338 on disc 244f is rotatable into and out of engagement with lateral face 378 of stop 374. Thus, when inner housing 228 is coupled with housing portion 204, stop 374 must be sufficiently angularly offset from a stop of the topmost rotational element in stop assembly 238. Likewise, cover 350 and partially enclosed space 362 are sized such that, when inner housing 228 is coupled with housing portion 204, stepped portion 368 is disposed slightly above lip 330 of disc 242f. This configuration may maximize the compactness of stop assembly 238 while allowing all of the rotational elements in stop assembly 238 to rotate independently of inner housing 238 until a stop on the top rotational element comes into contact with stop 374.

In this embodiment, the thickness of stop 374 is the same as the thickness of stepped portion 368, but that is not required in all embodiments. For instance, where, as here, a disc 244 is the top rotational element in stop assembly 238, stop 374 should be thin enough to avoid interfering with stop 322 on disc 242f while still being able to interfere with rotation of stop 338 on disc 244f In an embodiment where a disc 242 is the top rotational element in stop assembly 238, stop 374 may be thicker so that it can interfere with stop 322 on the disc 242. Similarly, where a disc 244 is the top rotational element in stop assembly 238, the radial distance between an internal edge 380 of stop 374 and annular rib 370 is slightly larger than the radius of disc 244 (excluding stop 338). It will be appreciated that, where a disc 242 is the top rotational element in stop assembly 238, the size, location, and/or orientation of stop 374 may change.

Those of skill in the art will appreciate many further variations within the scope of the invention. For example, in various embodiments, the size, location, and orientations of stops 306, 322, and 338 can be reversed or otherwise modified. Also, stop 374 can be disposed at any angular position about the axis of rotation 296 and need not be disposed at the particular angular position shown. Further, while stop assembly 238 in this embodiment comprises six (6) discs 242 and six (6) discs 244, in various embodiments, the number of rotational elements included in stop assembly 238 may depend on the amount of angular displacement of shaft 214 beyond 360 degrees that is needed or desired. Also, where discs 242 and/or 244 are coupled with a gear (e.g., gear 240), the number of such discs 242 and/or 244 included in stop assembly 238 may depend on the ratio of such gear to any gear coupled with the main shaft (e.g., shaft 214).

For example, in the illustrated embodiment, gear 240 may have a ratio of about 7:1 with the gear 222 that is coupled with shaft 214. Thus, gear 222 completes about seven (7) revolutions for every single revolution of gear 222. As discussed above, such a gear reduction (which could be lower or greater in other embodiments) reduces the torque on the stops of stop assembly 238 when a rotational limit is encountered, making the trolling motor assembly 201 more robust. However, to achieve a desired amount of rotation of shaft 214, the amount of angular displacement that each of gear 240 and discs 242, 244 are permitted about axis of rotation 296 must be considered. Analogously, the angular width or extent defined by each stop 306, 322, 338, and/or 374 could be considered. In the illustrated embodiment, each disc 242, 244 can rotate about 330 degrees about axis of rotation 296, and gear 240 can rotate another about 330 degrees. Thus, between the stop assembly 238's two limits on rotation, gear 240 can rotate through about 4290 degrees. (Each other rotational element between gear 240 and inner housing 228 is rotatable through a smaller angular displacement before encountering a rotational limit, depending on their proximity to stop 374 of housing 228.) This means that shaft 214 can rotate through about 613 degrees, or 306.5 degrees in either direction from a "neutral" position, which may be, for example, a position at which the propulsion motor is parallel with the boat's keel. To achieve any other needed or desired amount of angular displacement of shaft 214, a similar set of calculations could be performed, again considering the gear ratio (if applicable) and the amount each rotational element used can rotate about the axis of rotation 296 to select the necessary number of rotational elements, and the size(s) of any or all stop(s) on the rotational elements can be modified to make small adjustments to the final amount of rotation of shaft 214.

In one example of use, in response to a user's input to change direction of the trolling motor, motor 232 is operated to cause rotation of gear 240 in a counter-clockwise direction via gears 284 and 270, as described above. At the same time, via gear 260, gear 222, the trim assembly, and shaft 214 also are caused to rotate. Those of skill in the art will appreciate that, due to the force of gravity and the frictional force between rotational elements, in some embodiments discs 242, 244 in a stop assembly 238 may initially rotate with gear 240 as gear 240 is rotated, at least until one of the discs 242, 244 encounters another stop (which may be, e.g., stop 374). Thus, as gear 240 is rotated, discs 242a, 244a, 242b, 244b, 242c, 244c, 242d, 244d, 242e, 244e, 242f, and 244f may initially rotate with gear 240 relative to inner housing 228, and this rotation continues until lateral face 342 of stop 338 of disc 244f comes into engagement with lateral face 376 of stop 374 on inner housing 228. At that point, disc 244f is prevented from further rotation in the counter-clockwise direction.

Assuming that gear 240 is caused to continue to rotate in the same direction, discs 242a, 244a, 242b, 244b, 242c, 244c, 242d, 244d, 242e, 244e, and 242f will also continue to rotate in this example. (As noted above, here stop 374 does not interfere with rotation of disc 242f.) Disc 242f will continue to rotate until lateral face 324 of stop 322 of disc 242f comes into engagement with lateral face 344 of stop 338 of disc 244f, which is prevented from further counter-clockwise rotation as noted above. As a result, disc 242f also is prevented from further counter-clockwise rotation, while the remaining discs 242, 244 can continue in that direction. It is noted that if the relative angular positions of discs 242, 244 at the start of rotation of gear 240 are those shown in FIG. 6, and assuming that the stack of discs 242, 244 initially rotate together, then stop 322 of disc 242f may already be in engagement with stop 337 of disc 244f at the time disc 244f is prevented from further rotation, in which case disc 242f does not rotate further in this direction relative to disc 244f. Of course, the angular positions of discs 242, 244 at the start of rotation will vary and frequently will differ from the example of FIG. 6.

Again assuming that gear 240 is caused to continue to rotate in the same direction, discs 242a, 244a, 242b, 244b, 242c, 244c, 242d, 244d, 242e, and 244e will also continue to rotate in this example. Disc 244e will continue to rotate until lateral face 342 of stop 338 of disc 244e comes into engagement with lateral face 326 of stop 322 of disc 242f, which also is prevented from further counter-clockwise rotation as noted above. As a result, disc 244e also is prevented from further counter-clockwise rotation, while the remaining discs 242, 244 can continue in that direction.

This pattern will continue with the remaining discs 242, 244 as long as gear 240 is caused to rotate in the counter-clockwise direction. Thus, for example, disc 242e will be stopped from further rotation once lateral face 324 of stop 322 of disc 242e comes into engagement with lateral face 344 of stop 338 of disc 244e; then disc 244d will be stopped from further counter-clockwise rotation once lateral face 342 of stop 338 of disc 244d comes into engagement with lateral face 326 of stop 322 of disc 242e; then disc 242d will be stopped from further counter-clockwise rotation once lateral face 324 of stop 322 of disc 242d comes into engagement with lateral face 344 of stop 338 of disc 244d; then disc 244c will be stopped from further counter-clockwise rotation once lateral face 342 of stop 338 of disc 244c comes into engagement with lateral face 326 of stop 322 of disc 242d; then disc 242c will be stopped from further counter-clockwise rotation once lateral face 324 of stop 322 of disc 242c comes into engagement with lateral face 344 of stop 338 of disc 244c; then disc 244b will be stopped from further counter-clockwise rotation once lateral face 342 of stop 338 of disc 244b comes into engagement with lateral face 326 of stop 322 of disc 242c; then disc 242b will be stopped from further counter-clockwise rotation once lateral face 324 of stop 322 of disc 242b comes into engagement with lateral face 344 of stop 338 of disc 244b; then disc 244a will be stopped from further counter-clockwise rotation once lateral face 342 of stop 338 of disc 244a comes into engagement with lateral face 326 of stop 322 of disc 242b; and then disc 242a will be stopped from further counter-clockwise rotation once lateral face 324 of stop 322 of disc 242a comes into engagement with lateral face 344 of stop 338 of disc 244a.

Finally, when gear 240 is further rotated in a counter-clockwise direction relative to now-stopped disc 242a, lateral face 308 of stop 306 will come into contact with lateral face 326 of stop 322 on disc 242a. Accordingly, gear 240 and, by extension, gears 260, 270, 284, and 222 and shaft 214 also will be prevented from further counter-clockwise rotation. As noted above, depending on the angular starting position of the rotational elements of stop assembly, gear 240 may have rotated through up to about 4290 degrees, and shaft 214 may have rotated through up to about 613 degrees. Of course, such maximum rotation will have occurred only where the angular starting position was at the opposite "hard stop" or limit on rotation of shaft 214.

Accordingly, embodiments of the present invention may provide for greater than 360 degrees of rotation while also preventing over-rotation or "free-spin." Further, in some embodiments, it is contemplated that software associated with the processor may limit rotation through an angle less than the full possible rotation, such as through 540 degrees of a potential 600 degrees. Thus, in some embodiments, software may limit rotation of the propulsion motor to +/−270 degrees from a position at which the propulsion motor is centered or pointing forward. The processor may execute computer program code which, based on information received from one or more sensors disposed in the main housing, may keep track of the extent to which the propulsion motor has rotated through its available or permitted rotation. In this case, the additional potential (even if not permitted) rotational movement may be used to account for system tolerances. In the absence of rotation occurring when the power is removed from the trolling motor assembly or a software malfunction, a user may never encounter the rotational limit (e.g., hard stop) in such an embodiment.

Subsequently, when motor 232 is operated to cause gear 240 to rotate in a clockwise direction, the above-described operation will proceed in reverse, with lateral face 344 of stop 338 of disc 244f coming into engagement with lateral face 378 of stop 374 of inner housing 228; lateral face 326 of stop 322 of disc 242f coming into engagement with lateral face 342 of stop 338 of disc 244f; lateral face 344 of stop 338 of disc 244e coming into engagement with lateral face 324 of stop 322 of disc 242f; lateral face 326 of stop 322 of disc 242e coming into engagement with lateral face 342 of stop 338 of disc 244e; lateral face 344 of stop 338 of disc 244d coming into engagement with lateral face 324 of stop 322 of disc 242e; and so on. Assuming gear 240 continues to rotate in a clockwise direction, this will continue until lateral face 310 of stop 306 comes into engagement with lateral face 324 of stop 322 on disc 242a, which will have already been prevented from further clockwise rotation. As a result, gear 240 and, by extension, gears 260, 270, 284, and 222 and shaft 214 also will be prevented from further clockwise rotation.

Those of skill in the art will appreciate that, in contrast to the above, and in some embodiments, adjacent rotational elements of a stop assembly 238 might not rotate together until their respective stops come into engagement with one another. This may depend, among other factors, on the number of rotational elements included in stop assembly 238 and the materials used. In other words, and to give an example, when gear 240 is caused to be rotated, in some embodiments it may first rotate independently of discs 242a-244f until its stop 306 comes into contact with stop 322 of disc 242a. Then, gear 240 and disc 242a may rotate together relative to the remaining discs 244a-244f until stop 322 of disc 242a comes into contact with stop 338 of disc 244a. Next, gear 240, disc 242a, and disc 244a may rotate together relative to the remaining discs 242b-244f until stop 338 of disc 244a comes into contact with stop 322 of disc 242b. Continuing with the example, gear 240, disc 242a, disc 244a, and disc 242b may rotate together relative to the remaining discs 244b-244f until stop 322 of disc 242b comes into contact with stop 338 of disc 244b, and so on. This will continue until stop 338 of disc 244f is engaged by stop 322 of disc 242f and caused to rotate until stop 338 of disc 244f also engages stop 374 of inner housing 228, at which point stop assembly 238 and, correspondingly, shaft 214 will have reached a rotational limit. Those of skill in the art will appreciate that, whether adjacent rotational elements rotate together prior to their stops coming into engagement with one another or only once that occurs, or some combination of the two, the functionality of stop assembly 238 will remain the same.

Embodiments of the present invention also provide methods for operating trolling motor assemblies. Various examples of the methods performed in accordance with embodiments of the present invention will now be provided with reference to FIGS. 24-26. The operations illustrated in and described with respect to FIGS. 24-26 may, for example, be performed by, with the assistance of, and/or under the control of one or more of the processor 110, sonar signal processor 115, memory 120, communications element 108, position sensor 145, user interface 138, display 140, motor 130, foot pedal assembly 60, and/or remote control 70 or another user device.

First, FIG. 24 is a flowchart according to example methods for operating a trolling motor assembly according to an example embodiment. At operation 400, the process starts. At operation 402, provided are a main housing and a shaft rotatably coupled with the main housing, the shaft having a longitudinal axis. At operation 404, a first element is coupled with the shaft in the main housing. The first element has an axis of rotation that is spaced apart from the longitudinal axis and comprises a first stop. At operation 406, a second element is provided in the main housing along the axis of rotation. The second element has a second stop. At operation 408, a third element is provided in the main housing along the axis of rotation. The third element has a third stop. At operation 410, the shaft is rotated about the longitudinal axis through a first angular displacement exceeding 360 degrees. At operation 412, the first element is rotated through a second angular displacement about the axis of rotation, and at operation 414, the second element is rotated through a third angular displacement about the axis of rotation that is less than the second angular displacement. Finally, at operation 416, the third element is rotated through a fourth angular displacement about the axis of rotation that is less than the second and third angular displacements. At operation 418, the process ends.

Next, FIG. 25 is a flowchart according to example methods for operating a trolling motor assembly according to an example embodiment. At operation 450, the process starts. At operation 452, provided are a main housing and a shaft rotatably coupled with the main housing, the shaft having a longitudinal axis. At operation 454, a first gear is coupled with the shaft for rotation about the longitudinal axis. At operation 456, a second gear is coupled with the first gear. The second gear has an axis of rotation spaced apart from the longitudinal axis. At operation 458, a first disc is coupled with the second gear. The first disc comprises a first stop. At operation 460, a second disc is coupled with the second gear. The second disc comprises a second stop. At operation 462, the shaft is rotated about the longitudinal axis through a first angular displacement. At operation 464, during rotation of the shaft, the second gear is rotated about the axis of rotation through a second angular displacement that exceeds the first angular displacement. At operation 466, during rotation of the shaft, the first disc is rotated about the axis of rotation such that the first stop moves into and out of engagement with a third stop coupled with the second gear. Finally, at operation 468, during rotation of the shaft, the second disc is rotated about the axis of rotation such that the second stop moves into and out of engagement with a fourth stop coupled with the main housing. At operation 470, the process ends.

Also, FIG. 26 is a flowchart according to example methods for operating a trolling motor assembly according to an example embodiment. At operation 500, the process starts. At operation 502, provided are a main housing and a shaft rotatably coupled with the main housing, the shaft having a longitudinal axis. At operation 504, a gear is coupled with the shaft. The gear has an axis of rotation spaced apart from the longitudinal axis, and the gear comprises a first stop. The first stop has a first side and a second side. At operation 506, a first disc is coupled with the gear. The first disc comprises a second stop, and the second stop has a first side and a second side. At operation 508, a second disc is coupled with the gear. The second disc comprises a third stop, and the third stop has a first side and a second side. At operation 510, the shaft is rotated through a first angular displacement between a first angular position and a second angular position. At the first angular position, the first side of the third stop is in engagement with a fourth stop coupled with the main housing, the first side of the second stop is in engagement with the second side of the third stop, and the first side of the first stop is in engagement with the second side of the second stop. At the second angular position, the second side of the third stop is in engagement with the fourth stop, the second side of the second stop is in engagement with the first side of the third stop, and the second side of the first stop is in engagement with the first side of the second stop. At operation 512, the process ends.

Based on the foregoing, it will be appreciated that embodiments of the invention provide improved trolling motor assemblies and systems and methods for operating a trolling motor. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A trolling motor assembly, comprising:
a main housing;
a shaft rotatably coupled with the main housing, the shaft having a longitudinal axis and being rotatable about the longitudinal axis through a first angular displacement exceeding 360 degrees;
a first element disposed within the main housing and coupled with the shaft, the first element defining an axis of rotation that is spaced apart from the longitudinal axis, the first element being rotatable through a second angular displacement about the axis of rotation, the first element comprising a first stop;
a second element rotatable about the axis of rotation relative to the first element through a third angular displacement, the second element comprising a second stop;
a third element rotatable about the axis of rotation relative to the first element and to the second element through a fourth angular displacement, the third element comprising a third stop;
wherein the second angular displacement is greater than the third and fourth angular displacements, and wherein the third angular displacement is greater than the fourth angular displacement.

2. The trolling motor assembly of claim 1, wherein the first element comprises a gear.

3. The trolling motor assembly of claim 2, further comprising a motor disposed within the main housing, the motor having an output shaft.

4. The trolling motor assembly of claim 3, further comprising a second gear coupled with the shaft and rotatable about the longitudinal axis and a third gear coupled for rotation with the motor output shaft.

5. The trolling motor assembly of claim 4, further comprising a fourth gear engaged between the gear of the first element and the second gear.

6. The trolling motor assembly of claim 1, further comprising an inner housing disposed within the main housing, wherein a fourth stop is coupled with an interior surface of the inner housing.

7. The trolling motor assembly of claim 6, wherein the third stop of the third element comprises a first side and a second side, and wherein the fourth angular displacement is between a first angular position, at which the first side engages the fourth stop, and a second angular position, at which the second side engages the fourth stop.

8. The trolling motor assembly of claim 6, wherein the first stop is rotatable into and out of engagement with the second stop, the second stop is rotatable into and out of engagement with the first stop and the third stop, and the third stop is rotatable into and out of engagement with the second stop and the fourth stop.

9. The trolling motor assembly of claim 1, wherein the first angular displacement is about 600 degrees and wherein the second angular displacement is about 4200 degrees.

10. The trolling motor assembly of claim 1, further comprising a fourth element rotatable through a fifth angular displacement about the axis of rotation that is less than the third and fourth angular displacements.

11. A trolling motor assembly, comprising:
a main housing;
a shaft rotatably coupled with the main housing, the shaft having a longitudinal axis and being rotatable about the longitudinal axis through a first angular displacement that exceeds 360 degrees;
a first gear coupled with the shaft for rotation about the longitudinal axis;
a second gear coupled with the first gear, the second gear having an axis of rotation spaced apart from the longitudinal axis, the second gear being rotatable about the axis of rotation through a second angular displacement that exceeds the first angular displacement;

a plurality of discs coupled with the second gear, each of the plurality of discs being rotatable about the axis of rotation relative to one another and to the second gear, wherein a first disc of the plurality of discs defines a first stop that is rotatable into and out of engagement with a second stop coupled with the second gear, and wherein a second disc of the plurality of discs defines a third stop that is rotatable into and out of engagement with a fourth stop coupled with the main housing.

12. The trolling motor assembly of claim 11, wherein the first disc defines a top surface facing away from the second gear and a bottom surface opposite the top surface, the first disc further comprising a circumferential lip that projects from the top surface and from the bottom surface.

13. The trolling motor assembly of claim 12, wherein the peripheral lip comprises a bead projecting from the lip.

14. The trolling motor assembly of claim 12, wherein the first stop comprises a member projecting from the top surface and from the bottom surface and extending radially inward from the peripheral lip.

15. The trolling motor assembly of claim 11, wherein the second disc comprises an annular body portion and a tab projecting radially outward from the annular body portion.

16. The trolling motor assembly of claim 11, wherein the plurality of discs comprises eight or more discs.

17. The trolling motor assembly of claim 11, wherein the second gear comprises a cylindrical projection on which the plurality of discs are disposed.

18. A trolling motor assembly, comprising:
a main housing;
a shaft rotatably coupled with the main housing, the shaft defining a longitudinal axis;
a gear coupled with the shaft, the gear having an axis of rotation spaced apart from the longitudinal axis, the gear comprising a first stop, the first stop having a first side and a second side;
a first disc coupled with the gear and rotatable with respect thereto about the axis of rotation, the first disc comprising a second stop, the second stop having a first side and a second side; and
a second disc coupled with the gear and rotatable with respect thereto about the axis of rotation, the second disc comprising a third stop, the third stop having a first side and a second side;
wherein the shaft is rotatable through an angular displacement between a first angular position and a second angular position;
wherein, at the first angular position, the first side of the third stop is in engagement with a fourth stop coupled with the main housing, the first side of the second stop is in engagement with the second side of the third stop, and the first side of the first stop is in engagement with the second side of the second stop;
wherein, at the second angular position, the second side of the third stop is in engagement with the fourth stop, the second side of the third second stop is in engagement with the first side of the third stop, and the second side of the first stop is in engagement with the first side of the second stop.

19. The trolling motor assembly of claim 18, wherein the first disc is formed from a plastic material.

20. The trolling motor assembly of claim 19, wherein the second disc is formed from a metal material.

* * * * *